(12) United States Patent
Moroto et al.

(10) Patent No.: US 7,864,198 B2
(45) Date of Patent: Jan. 4, 2011

(54) IMAGE PROCESSING METHOD, IMAGE PROCESSING DEVICE AND MOBILE COMMUNICATION TERMINAL

(75) Inventors: Mineko Moroto, Tokyo (JP); Akiho Shibata, Tokyo (JP); Takashi Katayama, Tokyo (JP); Junko Asakura, Tokyo (JP); Yusaku Nagai, Tokyo (JP)

(73) Assignee: Vodafone Group Plc., Newbury, Berkshire (GB)

( * ) Notice: Subject to any disclaimer, the term of this patent is extended or adjusted under 35 U.S.C. 154(b) by 348 days.

(21) Appl. No.: 11/498,983

(22) Filed: Aug. 4, 2006

(65) Prior Publication Data

US 2007/0183679 A1      Aug. 9, 2007

Related U.S. Application Data

(63) Continuation of application No. PCT/JP2005/001753, filed on Feb. 7, 2005.

(30) Foreign Application Priority Data

Feb. 5, 2004    (JP)    ............................. 2004-029943

(51) Int. Cl.
G09G 5/00    (2006.01)
G06K 9/20    (2006.01)
(52) U.S. Cl. .................... 345/629; 345/626; 345/630; 382/291; 382/294
(58) Field of Classification Search ................. 345/629, 345/632, 634

See application file for complete search history.

(56) References Cited

U.S. PATENT DOCUMENTS 4,845,641 A * 7/1989 Ninomiya et al. ........... 345/632

(Continued)

FOREIGN PATENT DOCUMENTS

AU    4307499    11/1999

(Continued)

OTHER PUBLICATIONS

Anonymous; "Quick Time file Format;" Internet Citation at http://developer.apple.com/documentation/quickTime/QTFF; pp. 1-278. (pp. 1-8, 69-83, and 116-145 are cited in the Suppl. European Search Report.).

(Continued)

*Primary Examiner*—M Good Johnson
(74) *Attorney, Agent, or Firm*—Kratz, Quintos & Hanson, LLP

(57) ABSTRACT

A noted image information extraction section 31 specifies a region of a noted image in an original image, and noted image information containing information relating to position and size of the noted image WMM region within the original image is extracted. Continuing on, mask image formation means 31 forms a mask image by displaying superimposed on the original image, based on noted image information and mask image information registered in a mask image information file. As a result, a mask image comprised of element images selected using element image selection information contained in mask image information is formed at a specified position and specified size in the noted image region of the original image. A composite image having the mask image superimposed on the original image is then formed by composite image formation means 33. As a result, an image that a user has rendered in an original image is simply and appropriately formed, regardless of whether it is a still image or a moving picture.

13 Claims, 24 Drawing Sheets

U.S. PATENT DOCUMENTS

| | | | | |
|---|---|---|---|---|
| 5,469,536 | A * | 11/1995 | Blank | 345/594 |
| 5,831,591 | A * | 11/1998 | Suh | 715/201 |
| 6,141,433 | A * | 10/2000 | Moed et al. | 382/103 |
| 6,222,637 | B1 * | 4/2001 | Ito et al. | 358/1.18 |
| 6,400,374 | B2 * | 6/2002 | Lanier | 345/630 |
| 6,525,836 | B1 * | 2/2003 | Ito et al. | 358/1.18 |
| 6,542,936 | B1 * | 4/2003 | Mayle et al. | 709/250 |
| 6,556,704 | B1 * | 4/2003 | Chen | 382/154 |
| 6,961,446 | B2 * | 11/2005 | Imagawa et al. | 382/103 |
| 6,993,553 | B2 * | 1/2006 | Kaneko et al. | 709/201 |
| 7,200,247 | B2 * | 4/2007 | Ohba | 382/103 |
| 7,227,976 | B1 * | 6/2007 | Jung et al. | 382/103 |
| 7,230,653 | B1 * | 6/2007 | Overton et al. | 348/584 |
| 7,236,622 | B2 * | 6/2007 | Chen et al. | 382/132 |
| 7,317,826 | B2 * | 1/2008 | Wilensky et al. | 382/162 |
| 7,330,100 | B2 * | 2/2008 | Yu | 340/5.61 |
| 7,463,788 | B2 * | 12/2008 | Kameyama | 382/284 |
| 7,522,206 | B2 * | 4/2009 | Miki et al. | 348/333.01 |
| 2002/0015514 | A1 | 2/2002 | Kinjo | |
| 2002/0031262 | A1 | 3/2002 | Imagawa et al. | |
| 2005/0008246 | A1 | 1/2005 | Kinjo | |

FOREIGN PATENT DOCUMENTS

| | | |
|---|---|---|
| CN | 1344084 | 4/2002 |
| JP | 2000-322588 | 11/2000 |
| JP | 2001-292305 | 10/2001 |
| JP | 2002-77592 | 3/2002 |
| JP | 2003-309829 | 10/2003 |
| KR | 20020021032 | 3/2002 |
| WO | 99/57900 | 11/1999 |

OTHER PUBLICATIONS

The Supplemental European Search Report for corresponding European patent application, dated Mar. 21, 2007.

* cited by examiner

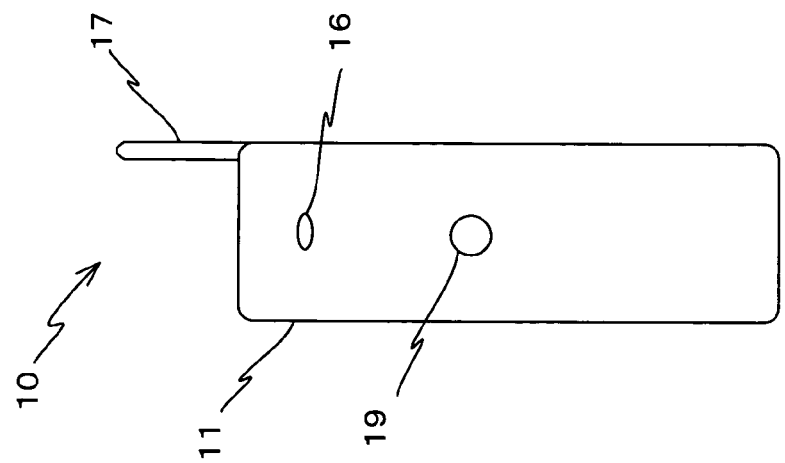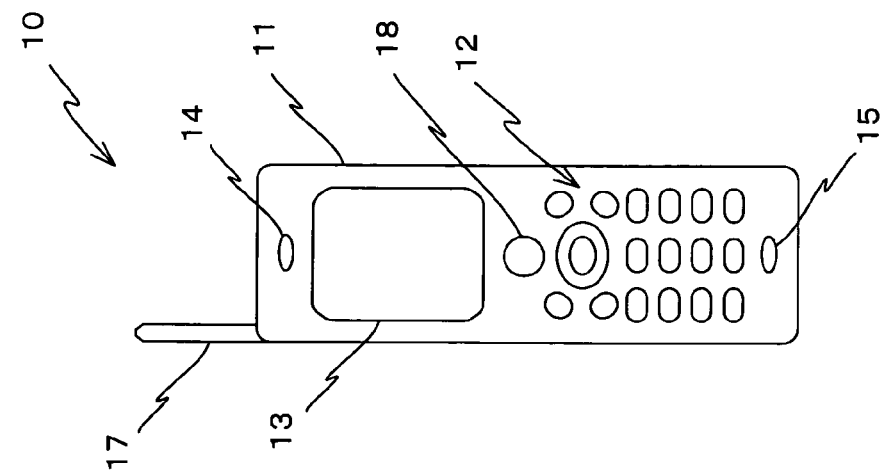

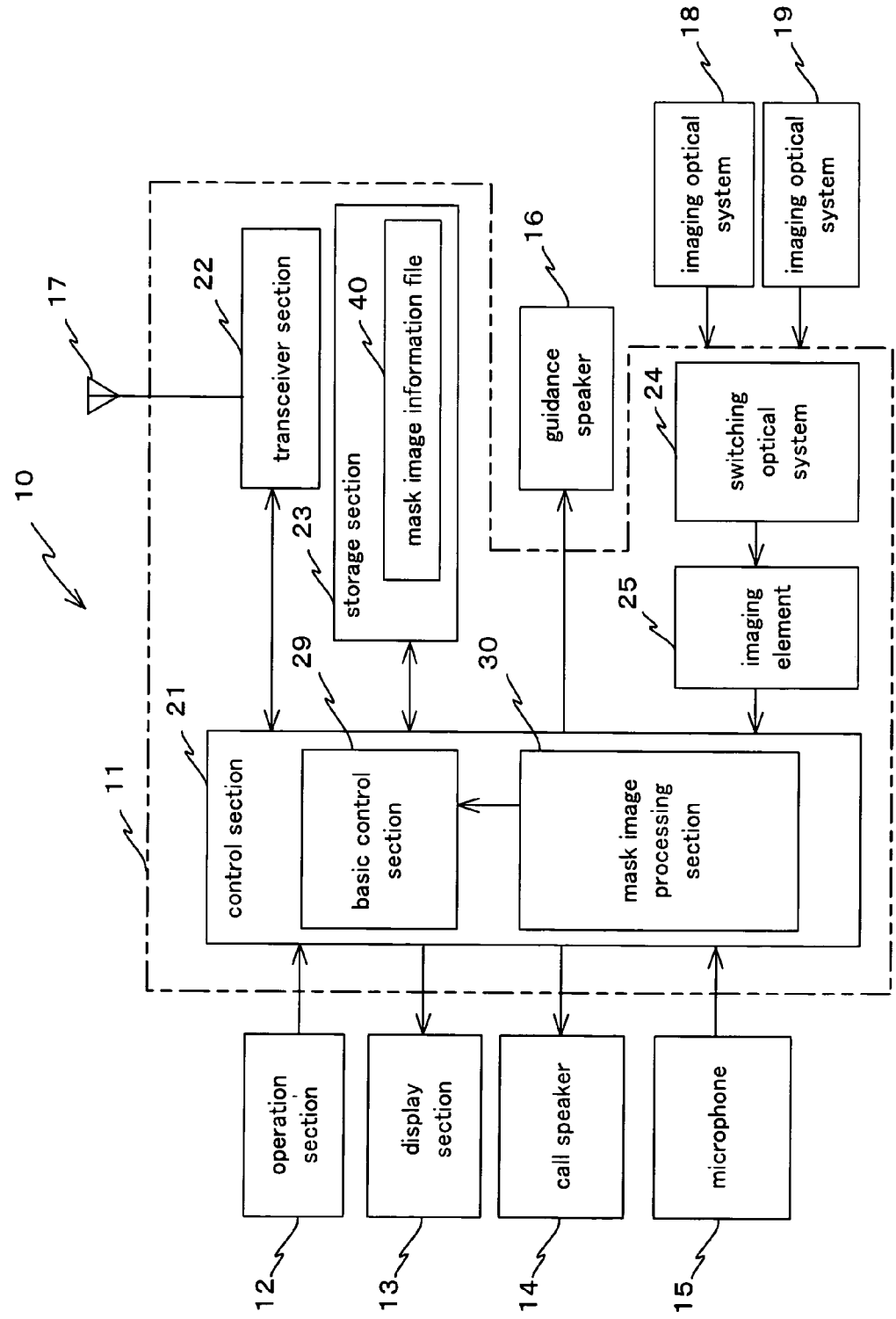

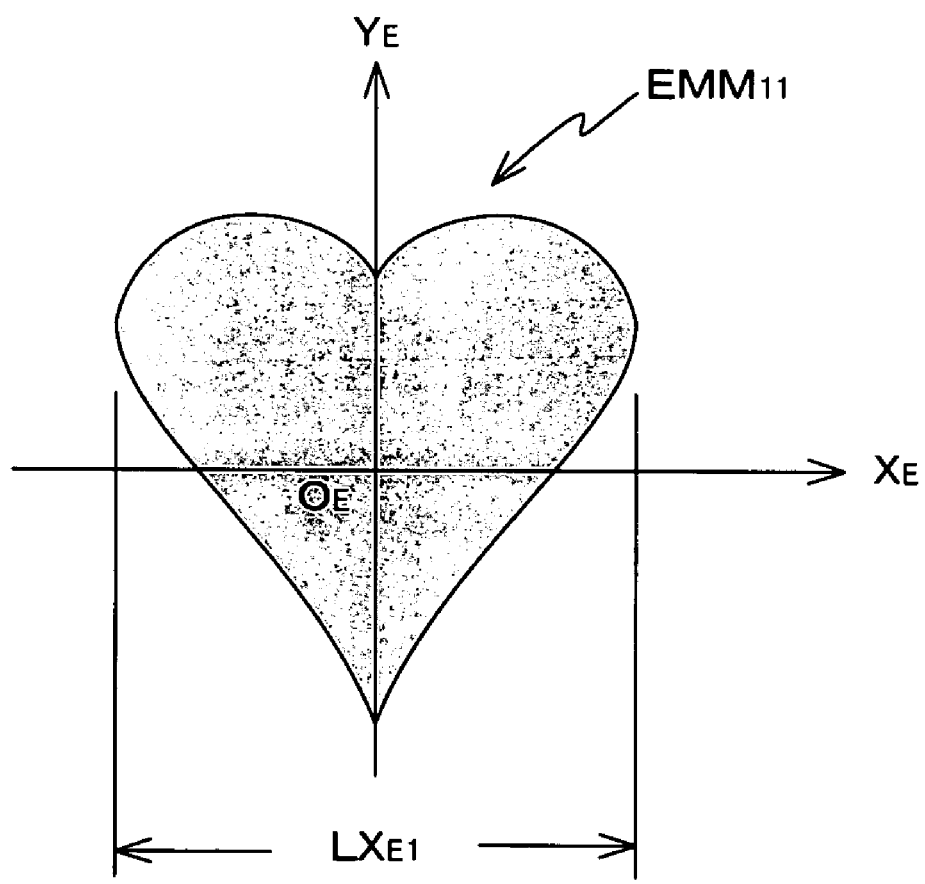

<simultaneous display designation>

<additional image 1 designation>

<display position designation = [$X_{W11}$, $Y_{W11}$] element image designation = [$EMM_{11}$] size designation =[$R_1$]>
        <end additional image 1 designation>

<additional image 2 designation>

<additional image 2 designation>

<display position designation = [$X_{W12}$, $Y_{W12}$] element image designation = [$EMM_{11}$] size designation = [$R_1$]>

<end additional image 2 designation>

<end simultaneous display designation>

Fig.8A $41_2$

<additional image 1 designation>
    <display position designation = [$X_{W2}$, $Y_{W2}$] element image designation = [$EMM_{21}$] size designation = [$R_{21}$] display time designation = [$T_{21}$]>

<display position designation = [$X_{W2}$, $Y_{W2}$] element image designation = [$EMM_{22}$] size designation = [$R_{22}$] display time designation = [$T_{22}$]>

<display position designation = [$X_{W2}$, $Y_{W2}$] element image designation = [$EMM_{23}$] size designation = [$R_{23}$] display time designation = [$T_{23}$]>

<end additional image 1 designation>

Fig.8B $41_3$

<simultaneous display designation>

<additional image 1 designation>

<display position designation = [$X_{W31}$, $Y_{W31}$] element image designation = [$EMM_{31}$] size designation = [$R_{31}$]>

<end additional image 1 designation>

<additional image 2 designation>

<display position designation = [$X_{W32}$, $Y_{W32}$] element image designation = [$EMM_{32}$] size designation = [$R_{32}$] display time designation = [$T_{32}$]>

<display position designation = [$X_{W33}$, $Y_{W33}$] element image designation = [$EMM_{33}$] size designation = [$R_{33}$] display time designation =[$T_{32}$]>

<end additional image 2 designation>

<end simultaneous display designation>

Fig.21

```
<simultaneous display designation>
    <additional image 1 designation>
        <display position designation = [Xw31, Yw31] element image
        designation = [EMM31] size designation = [R31]>
    <end additional image 1 designation>

<additional image 2 designation>
        <display position designation = [Xw32, Yw32] element image
        designation = [EMM32] size designation = [R32] display time
        designation = [T32]>

<display position designation = [Xw33, Yw33] element image
        designation = [EMM33] size designation = [R33] display time
        designation = [T32]>

<end additional image 2 designation>

<background image designation>
        <background image designation = [BMMA]>
    <end background image designation>

<end simultaneous display designation>
```

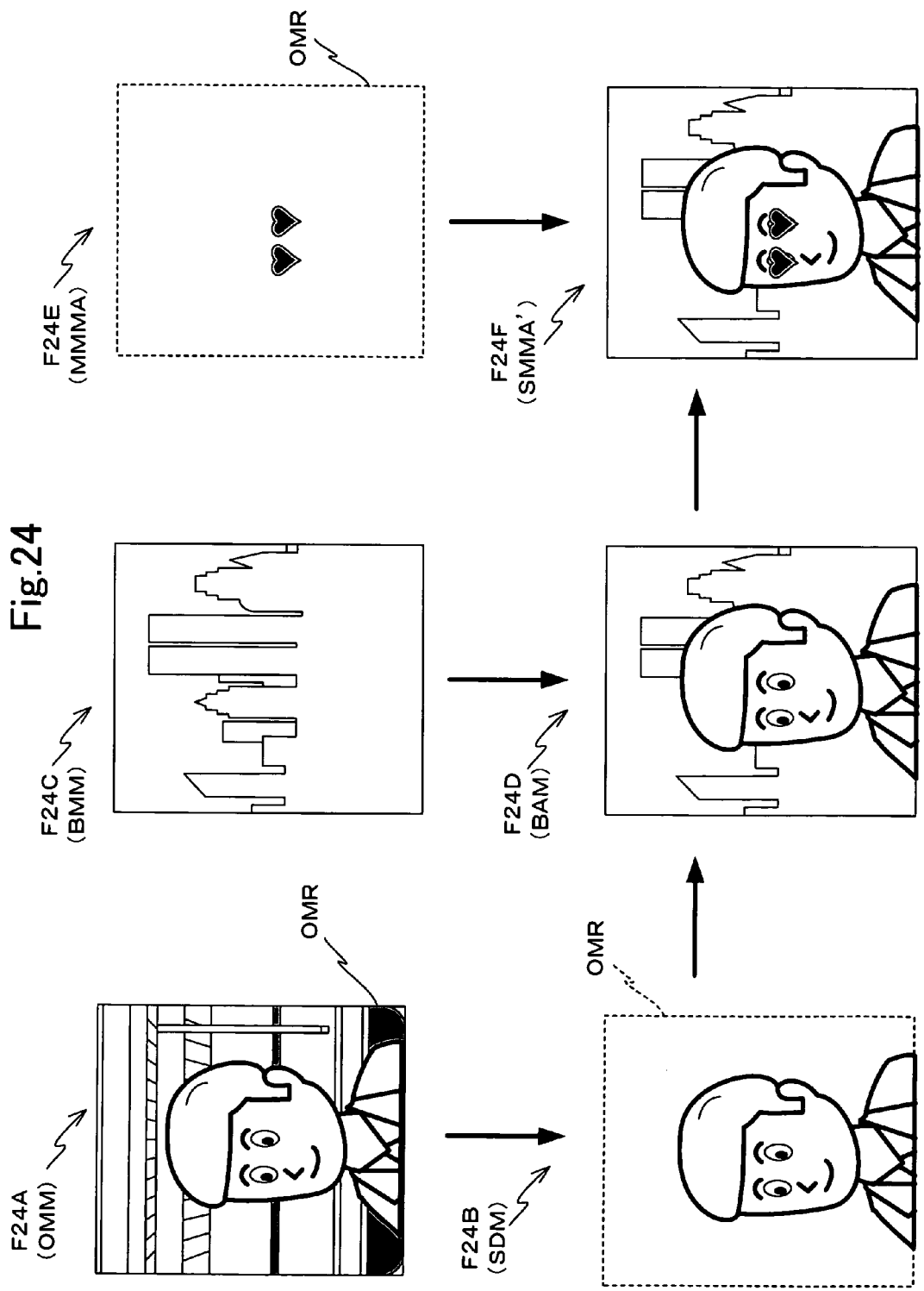

IMAGE PROCESSING METHOD, IMAGE PROCESSING DEVICE AND MOBILE COMMUNICATION TERMINAL

RELATED APPLICATION

This a continuation application of the international patent application No. PCT/JP2005/001753 filed with Application date: Feb. 7, 2005. The present application is based on, and claims priority from, J.P. Application 2004-029943, filed on Feb. 5, 2004, the disclosure of which is hereby incorporated by reference herein its entirety.

BACKGROUND OF THE INVENTION

The present invention relates to an image processing method, an image processing device and a mobile communication terminal, and in more detail relates to an image processing method for forming a composite image having a mask image superimposed on an original image, an image processing device using the image processing method, and a mobile communication terminal provided with the image processing device.

BACKGROUND ART

There have conventionally been various means for performing image processing to process an acquired original image. As technology for this type of image processing, there is facial recognition technology for recognizing that there is a facial image in an original image acquired using a digital camera or the like. There is also facial authentication technology that is a further advancement of this facial recognition technology, for extracting feature characteristics of a face and specifying an individual (refer to non-patent publication 1, and patent publications 1 and 2).

As background to this type of existing image processing technology relating to facial recognition, for example, there has also been proposed video telephone technology, where an image acquired by a transmission side terminal is sent as is, and not only displayed on a receive side terminal, but in order to protect privacy of the user of the transmission side terminal sent to the receive side terminal after carrying out image processing to change a background image resulting from acquisition to another image (refer to patent reference 3). With this technology, first of all, an image of the transmission side caller is extracted from an image acquired by a camera of the transmission side terminal. Then, a composite image is formed by superimposing the extracted caller image onto a pre-prepared background image, and the composite image is transmitted from the transmission side terminal to the receive side terminal. As a result, privacy information such as current location of the transmission side caller is not notified to the receiving side caller, and it becomes possible to hold a face-to-face conversation that feels comfortable.

Also, in order to protect the privacy of the transmission side user, technology has been proposed where a real time image of the transmission side caller is not used, but an image that has been selected by matching voice of the transmission side user from a pre-prepared plurality of still images of the transmission side caller or another caller is transmitted to the receive side terminal (refer to patent reference 3). Note that, In this case also, it is possible to form a composite image by superimposing the selected caller image onto a pre-prepared background image, and transmit the composite image from the transmission side terminal to the receive side terminal.

With this technology, with respect to the predetermined user or other user, still images are prepared for each time a vowel and the nasal "n" sound occurs, as required. The generated sound during the user's call is then analyzed, and as a result of analysis an image is selected for the obtained generated sound. Continuing on, a composite image is formed by superimposing the selected image onto a pre-prepared background image, and the composite image is transmitted from the transmission side terminal to the receive side terminal. As a result, also in cases where the fact that a real time image is transmitted would be inappropriate from the point of view of protecting privacy, such as when bathing, it is possible to hold a call that does not feel uncomfortable while referencing the images.

[non-patent reference 1] Eyematic Japan Ltd. "technical information", published Dec. 29, 2003, internet [URL:http://www.eyematic.co.jp/tech.html].

[Patent reference 1] Japanese patent laid-open No. 2003-271958

[Patent reference 2] Japanese patent laid-open No. 2003-296735

[Patent reference 3] Japanese patent laid-open No. 2003-309829

SUMMARY OF THE INVENTION

Problems to be Solved by the Invention

Image processing technology of the above described related art, such as image recognition, image authentication, image tracking etc. are extremely good at being capable of application to a moving picture, and various application have been considered. However, with this type of image processing technology, a user processes an original image according to their own preferences, and expressing their own innermost thoughts is not within the technical scope. For this reason, for example, even if the image processing technology of the related art is applied to video telephone, it is insufficient from the point of view of holding an enjoyable conversation in accordance with an image that reflects the interests of the transmission side caller while demonstrating the function of the video telephone.

Specifically, with the image processing technology of the related art, it has been considered that as long as it is possible to carry out production matching the interests of the user such as emphasizing the user's emotions in an original image, it would be possible to bring enjoyment to the user, but carrying out this type of production on an image is not possible, particularly when the original image is a moving picture.

When the original image is a fixed still image, this type of image production can be carried out by superimposing desired features and colored accessory images at desired sizes on desired positions of the stillimage. However, when a transmitted image is a moving picture changing from moment to moment with the passing of time, or an image equivalent to a moving picture, by displaying the accessory images at fixed position of a display screen a display image that is unpleasant arises.

For example, for an original image that contains a facial image of a user, when carrying out production to cause display of heart marks at positions of the eyes of on the facial image at almost the same size as the eyes, by displaying the heart marks superimposed at fixed positions of the display screen it is not possible to display the heart marks at positions of the eyes in the facial image for a moving picture that changes from moment to moment. Also, when the superimposed display corresponds not only to display position but also the size of the face in the moving picture, the display image becomes unpleasant.

The present invention has been conceived in view of the above described problems, and an object of the invention is to provide an image processing method capable of simply and appropriately forming an image that a user has produced on an original image, regardless of whether the original image is a moving picture or a still image.

Another object of the present invention is to provide a mobile communication terminal capable of transmitting an image the user has appropriately produced for an original image, regardless of whether the original image is a moving picture or a still image.

Means for Solving the Problems

An image processing method of the present invention is an image processing method for carrying out processing of an image, and comprises the steps of: specifying a noted image region, being a region for an image to be focused on, in an original image, and extracting noted information containing information relating to position and size of the noted image within the original image; forming a mask image to be displayed superimposed display on the original image, based on a mask image information file containing the noted image information, at least one relationship information representing a relationship to position and size of the noted image region, element image selection information representing selection of information of specified element images respectively corresponding to the relationship information, and at least one element image information selected using the element image selection information; and creating a composite image having the mask image superimposed on a noted image comprising image that includes the noted image of the noted image region at the same location and same size as for the original image.

With this image processing method, at least one relationship information representing a relationship between position and size of the noted image region, element image selection information representing selection of specified element image information respectively corresponding to the relationship information, and mask image information containing at least one element image information selected using the element image selection information, are registered in a predetermined mask image information file. In this case, "noted image region" is a region for a face in the original image containing a figure, for example, or a region capable of being specified by pictorial characteristics within an image assumed to be obtained from an original image.

As a premise for the existence of a mask image information file, first of all, in a noted image extraction step, the noted image region is specified in the original image, and noted image information containing information relating to the position and size of the noted image region within the original image is extracted. Continuing on, in a mask image data creation step, a mask image is created by displaying superimposed on the original image, based on noted image information and mask image information registered in the mask image information file. As a result, a mask image formed from element images selected using element image selection information contained in mask image information is formed on the original image at a position determined using information connected to position of a noted image region and information representing a relationship between noted image region in relationship information contained in mask image information, at a size determined by information representing a relationship between information connected to size of the noted position in the original image and size of the noted image region in the relationship information. Then, in a composite image creating step, a composite image having the mask image superimposed on a noted image comprising image that includes a noted image inside the noted image region, such as a facial image within a facial image region, for example, at the same location and same size as for the original image, is formed.

Accordingly, with the image processing method of the present invention, it is possible to simply and appropriately form an image that a user has produced according their interests for a noted image comprising image, regardless of whether the original image is a moving picture or a still image.

With the image processing method of the present invention, it is possible to make the noted image comprising image the original image. In this case, rendering of the original image according to the user's interests can be carried out by selecting a mask image.

Also, with the image processing method of the present invention, the mask image information file further comprises background image selection information representing selection of information for a specified background image, and in the composite image formation step a specified display image containing the noted image is cut from the original image, and the composite image can be formed after a background addition image has been made the noted image comprising image having the specified display image superimposed on the specified background image at the same position and size as for the original image.

In this case, in the composite image formation step, first of all a specified display image containing a noted image such as a figure is cut from the original image for the case where the noted image is a facial image. Continuing on, the specified display image is superimposed on a background image designated using background image selection information contained in the mask image information file, to form a background addition image. The above described mask image is then superimposed on this noted image comprising image, with the background addition image as the noted image comprising image. Accordingly, rendering of the specified display image, such as a figure and so forth, according to the user's interests can be carried out by selecting a mask image and a background image.

Also, with the image processing method of the present invention, it is possible for the information relating to the position of the noted image region to contain position information for a representative point of the noted image region of the original image. In this way, it is possible to make information representing a relationship with position of a noted region, in relationship information contained in the mask image information, information representing a relative relationship for a representative point of the noted image, and it is possible to simplify information representing a relationship with position of the noted image region in the relationship information. Note that, when information representing a relationship to position of the noted image region, in the relationship information, is made information representing a relative position with respect to the representative point of the noted image region, that relative position information is made relative position information for the case where the noted image region has a reference size, and it is possible to convert value of the relative position information to a value corresponding to the size of the noted image region in the original image, according to a proportion of the size of the noted image in the original image and the size of the noted image region constituting the reference. It is also possible to make a value of the relative position information a value after normalization using size of the noted image region in the original image, and to convert a value of the relative position information to a value corresponding to the size of the noted image region in the original image.

Here, the information relating to the position of the noted image region can further contain inclination information for the noted image region of the original image. In this case, by using the inclination information for the noted region of the original image it is possible to form a composite image displaying a desired element image superimposed at a position corresponding to the inclination of the noted image region in the original image. It is also possible to cause display by holding inclination in the displayed element image corresponding to inclination of the noted image region in the original image. Incidentally, the inclination information can be a single angle information representing a two dimensional inclination of the noted image, or two or three angle information representing three dimensional inclination of the noted image.

As described above, when position information for a representative point of the noted image in the original image and inclination information for the noted image region in the original image are contained in the information relating to position of the noted image region, representative point of the noted image region is made the origin in the relationship information, and it is possible for coordinate position data of a coordinate system determining direction of a coordinate axis based on inclination of the noted image region to be included as display position information for the specified element image. In this case, the information in the relationship information with respect to a representative point of the noted image region can be simply interpreted as coordinate position information of a coordinate system that determined by direction of coordinate axis based on inclination of the noted image region, wherein the system has an origin as a representative point of the noted image region. Herein, the noted information is the information representing a relative position of information relating to the position.

With the image processing method of the present invention, it is possible for the relationship information to contain proportion information for size of the noted image region and size of the specified graphic at the time of display. In this case, even when size of the noted image within the original image is changed from moment to moment, it is possible to form a mask image containing element images of size appropriate to the size of the noted image region.

Also, with the image processing method of the present invention, it is possible for the mask image information to further comprise respective execution time information for element image display fixed by combining the relationship information and element image selection information corresponding to the relationship information. In this case, by forming a mask image according to the execution time information, it is possible to display respective desired element images for only display execution times set to respective to desired times, and it is possible to form a mask image to vary the dynamic.

The mask image information further comprises information for display of a plurality of types of element image display in time sequence, fixed by combining the relationship information and element image selection information corresponding to the relationship information, and for time sequence display designation for designating repeat of time sequence display. In this case, by forming a mask image according to the time sequence display designation information, it is possible to display a plurality of types of element image on the original image repeatedly in time sequence every desired time.

Also, with the image processing method of the present invention, it is possible for the mask image information to further comprise simultaneous display designation information for designating display of a plurality of types of element image display at the same time, fixed by combining the relationship information and element image selection information corresponding to the relationship information. In this case, it is possible to form a mask image having a desired plurality of element images respectively displayed as desired positions, and it is possible to form mask images of numerous variations.

Note that, with the image processing method of the present invention, it is possible to make the original image a moving picture. In this case, for a moving picture in which position, inclination and size of the noted image in the original image is changing, it is possible to form a composite image that is dynamic and not unpleasant, in accordance with the user's interests.

A fixed phenomenon occurrence determination step for determining whether or not a predetermined phenomenon has occurred in the noted image region based on the noted image information is further provided, and the mask image data formation step and composite image data formation step are commenced after positive determination in the specified phenomenon occurrence determination step. In this case, in the fixed phenomenon occurrence detection step, when a predetermined phenomenon has occurred in the noted image region, since the mask image data formation step and the composite image formation step are commenced, it is possible to form a mask image where rendering is carried out in accordance with that phenomenon, and it is possible to form a composite image having that mask image superimposed on the original image. For example, in the case of a person's face, when the eyelids in the noted image can be closed, it is possible to form a composite image with tears flowing from the eyes.

An image processing device of the present invention is an image processing device for carrying out processing of an image, and comprises noted image information extracting means for specifying a noted image region, being a region for an image to be focused on, in an original image, and extracting noted information relating to position and size of the noted image region within the original image, storage means for storing a mask image information file registering mask image information containing at least one relationship information representing a relationship to position and size of the noted image region, element image selection information representing selection of information for a specified element image respectively corresponding to the relationship information, and at least one element image information selected using the element image selection information, mask image formation means for forming a mask image displayed superimposed on the original image, based on the noted image information and the mask image information, and composite image creation means for creating a composite image having the mask image superimposed on a noted image comprising image that includes the noted image inside the noted image region at the same location and same size as for the original image.

With this image processing device, noted image information extracting means specifies a noted image region in an original image, and extracts noted information relating to position and size of the noted image region within the original image. Continuing on, mask image data formation means forms a mask image by displaying superimposed on the original image, based on noted image information and mask image information registered in the mask image information file. Then, composite image formation means forms a composite image having the mask image superimposed on a noted image comprising image that includes the noted image within the noted image region at the same location and same size as for the original image.

Specifically, with the image processing device of the present invention, a composite image is formed using the image processing method of the present invention. Accordingly, according to the image processing device of the present invention it is possible to simply and appropriately form an image that a user has rendered on the noted image comprising image according to their interests, regardless of whether the original image is a still image or a moving picture.

With the image processing device of the present invention, it is possible for the noted image comprising image to comprise the original image. In this case, rendering of the original image according to the user's interests can be carried out by selecting a mask image.

With the image processing device of the present invention, it is possible to have a structure where the mask image information file further comprises background image selection information representing selection of information for a specified background image, and the composite image formation means cuts a specified display image containing the noted image from the original image, to form the composite image after a background addition image has been made the noted image comprising image having the specified display image superimposed on the specified background image at the same position and size as for the original image.

In this case, the composite image formation means first of all extracts a specified display image containing a noted image from the original image. Continuing on, the composite image formation means superimposes the specified display image on a background image designated using background image selection information contained in the mask image information file, to form a background addition image. The composite image formation means then superimposes the above described mask image on the background addition image. Accordingly, rendering of the specified display image, such as a figure and so forth, according to the user's interests can be carried out by selecting a mask image and a background image.

Also, with the image processing device of the present invention, it is possible have a structure further comprising display means for displaying the composite image. In this case, it is possible to confirm a composite image formed by a user of the composite image rendering according to their own interests by displaying the composite image using display means.

Also, with the image processing device of the present invention, it is possible have a structure further comprising display means for displaying the composite image. In this case, because it is possible to transmit a composite image formed by a user of the composite image carrying out rendering according to their interests at the transmission side towards the receive side, it is possible to notify a composite image formed by the user rendering according to their interests to the receiving party.

With the image processing device of the present invention, it is possible have a structure further comprising imaging means for acquiring the original image. In this case, it is possible to make an image acquired using the imaging means the original image, and it is possible to easily and appropriately form an image that a user has rendered on the original image according to their interests. Note that, it is also possible for an image acquired by the imaging means to be a still image or a moving picture.

A mobile communication terminal of the present invention is a mobile communication terminal provided with the imaging processing device of the present invention. With this mobile communication terminal, since it is possible to transmit a composite image formed by the image processing device of the present invention to a receive side terminal, it is possible to transmit an image that a user renders in an original image according to their tastes regardless of whether it is a still image or a moving picture.

Effects of the Invention

As is described above, according to the image processing method of the present invention, it is possible to simply and appropriately form an image that a user rendered in an original image, regardless of whether it is a still image or a moving picture.

Also, according to the image processing device of the present invention, since it is possible to form a composite image using the image processing method of the present invention, it is possible to easily and appropriately form an image that was rendered by a user in an original image regardless of whether the original image is a moving picture or a still image.

Also, according to the mobile communication terminal since the image processing device of the present invention is provided it is possible to transmit an image a user appropriately produced for an original image, regardless of whether it is a moving picture or a still image.

BRIEF DESCRIPTION OF THE DRAWINGS

FIG. 1A schematically shows the external structure of a front side of a mobile telephone unit of a first embodiment of the present invention;

FIG. 1B schematically shows the external structure of a rear side of a mobile telephone unit of the first embodiment of the present invention;

FIG. 2 is functional block diagram for describing the internal structure of the mobile telephone unit of FIG. 1A and FIG. 1B;

FIG. 6 is a first drawing showing an example of an element image;

FIG. 7 is a first drawing showing example contents of the display designation file of FIG. 5A;

FIG. 8A is a second drawing showing example contents of the display designation file of FIG. 5A;

FIG. 8*b* is a third drawing showing example contents of the display designation file of FIG. 5A;

FIG. 21 is a drawing showing example contents of the display designation file of FIG. 20;

FIG. 24 is a flowchart for explaining a composite image formation operation for composite image formation section in FIG. 19.

DETAILED DESCRIPTION

First Embodiment

Figure 3:
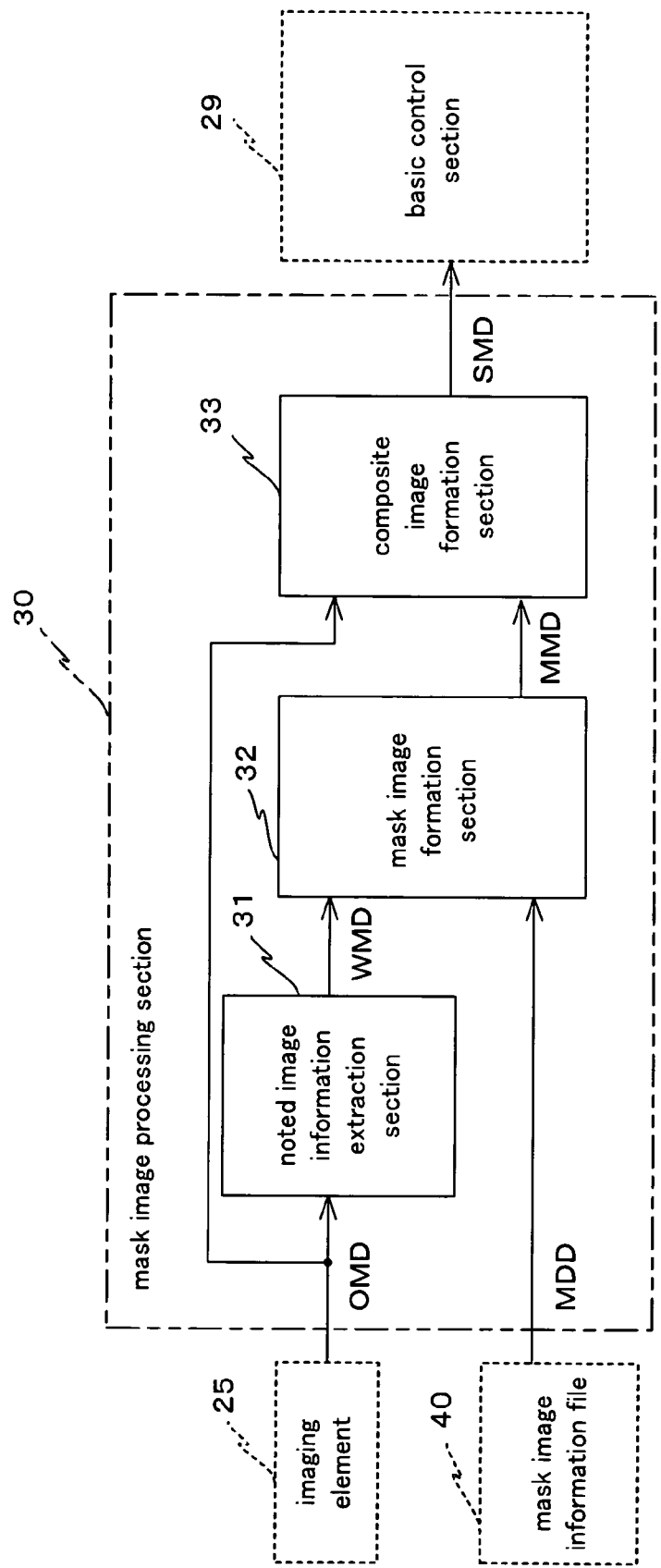
FIG. 3 is functional block diagram for describing the internal structure of a mask image processing section of FIG. 2.

A first embodiment of the present invention will be described in the following with reference to FIG. 1A-FIG. 17. The structure of a mobile telephone unit 10, being a mobile communication terminal of a first embodiment, is shown schematically in FIG. 1 and FIG. 2. In this embodiment, a front view of the external appearance of the mobile telephone unit 10 is shown in FIG. 1A, and a rear view of the external appearance of the mobile telephone unit 10 is shown in FIG. 1B. Also, the functional block structure of the mobile telephone unit 10 is shown in FIG. 2.

As shown comprehensively in FIG. 1A, FIG. 1B and FIG. 2, the portable telephone unit 10 is comprised of (a) a portable telephone body 11 provided with a control section 21 and so forth, which will be described later, (b) an operating section 12 having a numerical keypad for input of telephone numbers and function keys for inputting various commands such as operation mode switching, to the control section 21, and (c) a display section 13 having a liquid crystal display for displaying operation guidance, operating status, received messages etc. in response to commands from the control section 12. The portable telephone 10 is also comprised of (d) a call speaker 14 for reproducing voice signals transmitted from a calling party at the time of a call and a microphone 15 for inputting sound at the time of a call, and (e) a guidance speaker 16 for generating ring alerts and guidance voice in response to commands from the control section 21. Further, the portable telephone unit 10 is further comprised of (f) an antenna 17 connected to a transmission section 22 for transceiving wireless signals between the unit and a base station. Still further, the portable telephone unit 10 comprises (g) an imaging optical system for taking pictures of an operator side operating the operating section 12 while looking at the display on the display section 13, that is, for carrying photography in a so-called self-facing state, and (h) an imaging optical system 19 for taking pictures facing towards the field of vision of the operator, that is, taking pictures in a so-called other-party state.

As shown in FIG. 2, the portable telephone body 11 comprises (i) a control section 21 for unified control of all operations of the portable telephone unit 10, and also performing various data processing, (ii) a transceiver section 22 for transceiving wireless signals to and from a base station via the antenna 17, and (iii) a storage section 23 for storing various data. The portable telephone body 11 also comprises a switching optical system 24 for making either light passing through the imaging optical system 18 or light passing through the imaging optical system 19 be emitted towards an imaging element 25 that will be described later, under the control of the control section 21, and (iv) an imaging element 25 such as a CCD element for imaging an optical image formed by light on a light receiving surface via the switching optical system 24. In this case, the imaging element 25 carries out imaging operations under the control of the control section 21, and imaging results are notified to the control section 21.

The control section 21 is provided with a basic control section 29 and a mask image processing section 30. In this case, the basic control section 29 controls starting and stopping of operation of the mask image processing section 30, and also controls each element arranged external to the control section 21 and performs data processing besides image processing for mask image formation, that will be described later.

As shown in FIG. 3, the mask image processing section 30 mentioned above comprises a noted image extraction section 31, a mask image formation section 32 and a composite image formation section 33. The noted image extraction section 31 specifies a noted image region, such as a facial region of a specified person (for example, the user of the portable telephone unit 10) in the original image, for example, based on original image data OMD from the imaging element 25, and extracts noted image information WMD made up of position information for a representative point of the noted image region in the original image, inclination information of the noted image region in the original image, and size information of the noted image region.

Figure 4A:
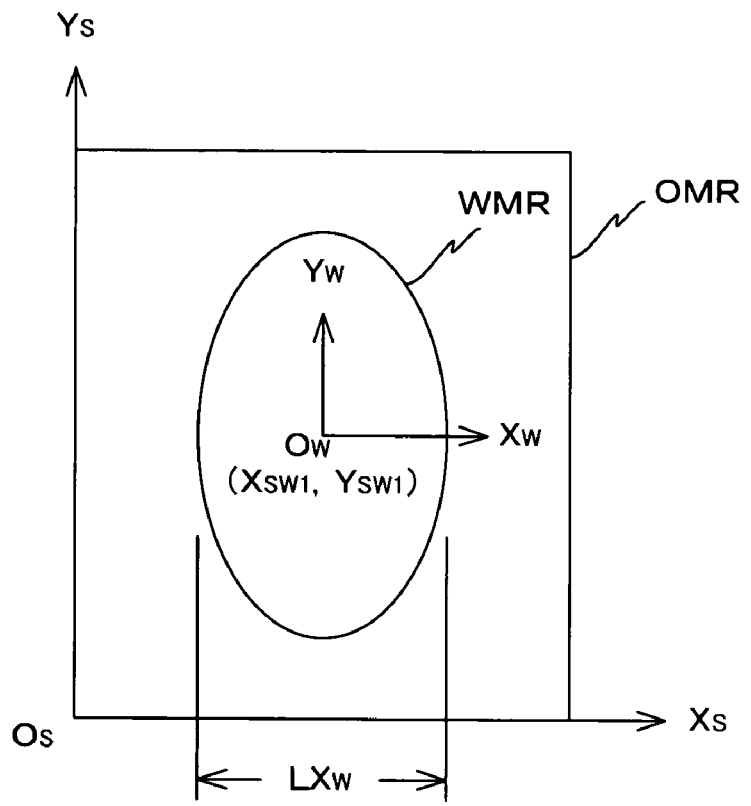
FIG. 4A is a first drawing for describing noted image region information.
Figure 4B:
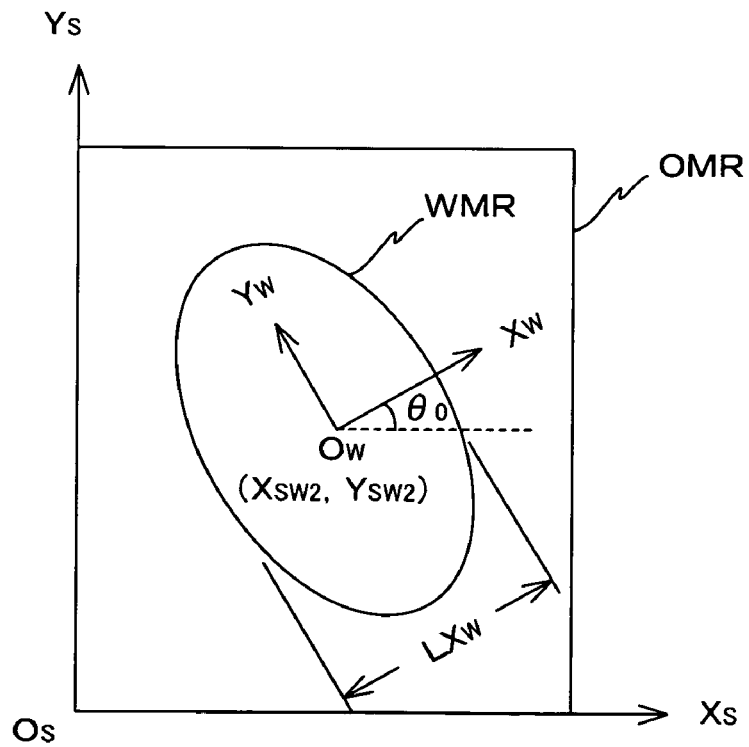
FIG. 4B is a second drawing for describing noted image region information.

Description will now be given of the extraction of the noted image information WMD. In the following, to simplify the description a 2-dimensional case will be dealt with disregarding the structure with respect to a display surface of body to be imaged in the original image, and the structure of the body to be images along a length direction in the original image will not be considered. Also, as shown in FIG. 4A and FIG. 4B, a noted image region WMR is specified in the original image region OMR. In this case, the case where the noted image region WMR is inclined on the reference (that is inclination angle $\theta_W=0$) is shown schematically in FIG. 4A. Also, the case where inclination is only $\theta_0$ from the reference inclination (inclination angle $\theta_W=\theta_0$) is shown in FIG. 4B. Each element position in the original image region OMR is represented using coordinate values of an $X_S Y_S$ coordinate system, which is the original image coordinate system. Also, in the noted image WMR, the representative point $O_W$ is made the origin, and when inclination angle $\theta_W=0$ an axis parallel to the $X_S$ axis is made an $X_W$ axis, and an axis parallel to the $Y_S$ axis is made a $Y_W$ axis to define a noted image coordinate system (that is an $X_W Y_W$ coordinate system). Inclination angle $\theta_W$ is represented by a counterclockwise angle.

In the case of FIG. 4A, after specifying a noted image region WMR in the original image region OMR, the noted image information extraction section 31 first of all obtains coordinate position $O_W(X_{SW1}, Y_{SW1})$ of the original image coordinate system for the representative point $O_W$, as position information for the representative point in the noted image WMR. In this case, as the representative point of the noted image region WMR, it is possible to adopt a distinctive point of a noted image region acquired using image analysis, such as taking a tip position of a nose in a facial image, in the case where the noted image us a facial image of a specified person.

Next, the noted image information extraction section 31 obtains a crossing angle $\theta_W$ of the $X_S$ axis and the $X_W$ axis (that is, the above described inclination angle $\theta_W$) as inclination information of the noted image WMR in the original image region OMR. Inclination angle $\theta_W$ is obtained by calculating a difference between a crossing angle of the $X_S$ axis and a characteristic direction as a noted image in the noted image region WMR defined with a predetermined inclination angle $\theta_W$ of "0", and a crossing angle of the $X_S$ axis and the characteristic direction in the noted image inside the original image. As this characteristic direction, for example, it is possible to adopt a long axis direction or short axis direction of an approximate ellipse in the case where the shape of the noted region WMR can approximate to elliptical, or a direction linked to a central position both eyes in a facial image in the case where the noted image is a facial image of a specified person. If the inclination angle $\theta_W$ (in the case of FIG. 4A, $\theta_W=0$) is obtained in this manner, it becomes possible to obtain the $X_W Y_W$ coordinate system (noted coordinate system) within the original image region OMR.

Next, the noted image information extraction section 31 obtains a characteristic length relating to the noted image region WMR, as size information for the noted image region WMR. In this embodiment, the width of the noted image region on the $X_W$ axis is made the characteristic length (width $LX_W$ in FIG. 4A). Note that, as the size information for the noted image region WMR, it is possible to adopt the width of the noted image region WMR on the $Y_W$ axis, maximum width of the noted image region WMR in the $X_W$ axis (or $Y_W$ axis) direction, a distance between two characteristic points in the noted image region (for example, a distance between the centers of two eyes in a facial image when the noted image is a facial image of a specified person), or the length of an $X_W$ axis component of the distance or the length of a $Y_W$ axis component of the distance, as well as the width $LX_W$ of the noted image region WMR on the $X_W$ axis.

In the case of FIG. 4B also, similarly to the case of FIG. 4A described above, after specifying a noted image region WMR in the original image region OMR, the noted image information extraction section 31 obtains position information, inclination information and size information for the representative point in the noted image WMR. Note that, in the case of FIG. 4B, a coordinate position $O_W(X_{SW2}, Y_{SW2})$ for the original image coordinate system of the representative point $O_W$ is obtained as the position information of the representative point, inclination angle $\theta_W=\theta_0$ is obtained as the inclination information of the noted region WMR, and a width $LX_W$ of the noted image region on the $X_W$ axis is obtained as the size information of the noted image region WMR.

The above mentioned mask image formation section 32 forms mask image data MMD based on noted image information WMD extracted by the noted image information extraction section 31, and mask image information MDD stored in the above mentioned storage section 23. Note that, formation of the mask image data MMD using the mask image information MDD and the mask image formation section 32 will be described later.

The above mentioned composite image formation section 33 forms composite image data SMD having the mask image superimposed on the original image based on the original image data OMD and the mask image data MMD. Note that, the composite image data SMMD formed by the composite image formation section 33 is notified to the basic control section 29.

Note that, in this embodiment, the control section 21 is provided with a central processing unit (CPU), digital signal processor (DSP) and so forth. Then, various data processing is carried out by the basic image processing section 29 and mask image processing section 30, constituted by programs executed by the control section 21, in order to realize portable telephone functions, including mail interchange processing, and besides that operational control of other structural elements is also performed.

Figure 5A:
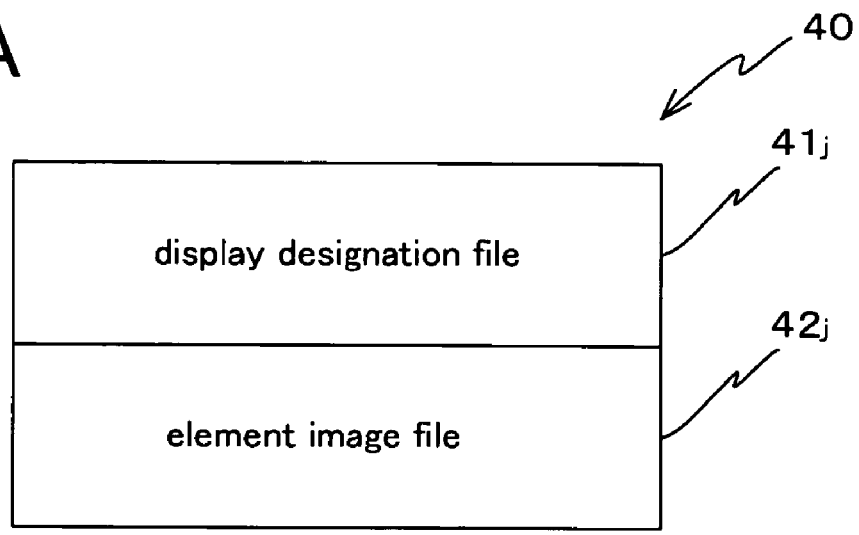
FIG. 5A is drawing for describing the mask image information file structure of FIG. 2.

Returning to FIG. 2, a mask image information file 40 is stored in the storage section 23. As shown in FIG. 5A, this mask image information file is comprised of (i) a display designation file $41_j$ storing display designation descriptors for designating as to with what relationship to the noted image region in the original image the mask image is displayed, and (ii) an element image file $42_j$ storing element image data designated using display designation descriptors in the display designation file $41j$. Note that, the mask image information file 40 is provided to the portable telephone unit 10 from a contents server via a wireless circuit, or is provided after being formed by the user using a personal computer or the like by means of storage medium or an external interface, not shown in this figure.

Figure 5B:
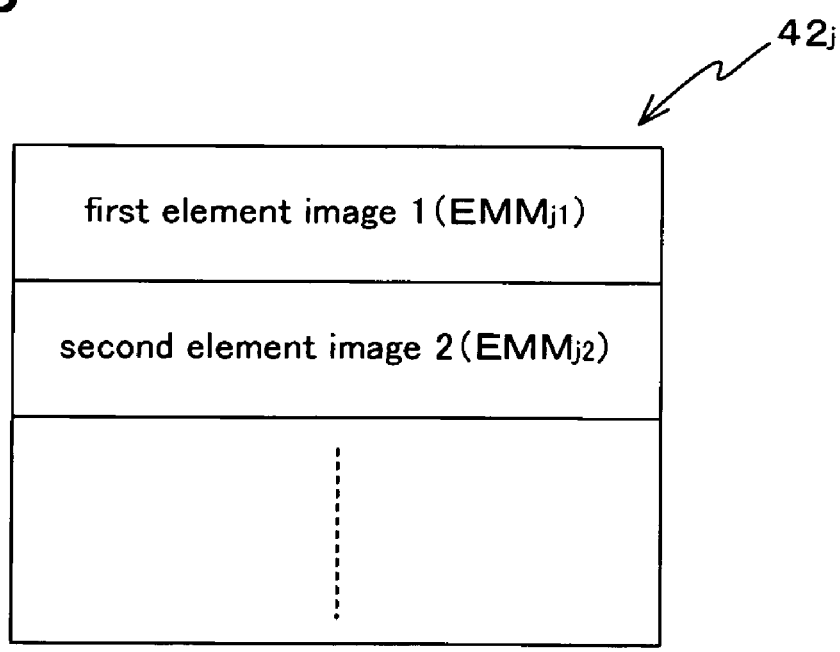
FIG. 5B is drawing for describing the element image file structure of FIG. 5A.

As shown in FIG. 5B, element images are stored in the element image file $42j$. Note that, hereafter, the $i^{th}$ element image, stored in the element image file $42j$, will be denoted element image $EMM_{ji}$. With FIG. 5B, a case is shown where there are a plurality of element images stored in the element image file $42j$, but there may be cases where the number of element images stored in the element image file $42j$ is one, or cases where it is 2 or more. A element image $EMM_{ji}$, for example, there is a heart shaped image or a lip shaped image and so forth.

In this manner, the element image $EMM_{ji}$ is formed in a coordinate system inherent to the element image, that is in the $X_E Y_E$ coordinate system making a representative point (in FIG. 6 the center point of element image $EMM_{11}$) of element image $EMM_{ji}$ an origin $O_E$, as shown representatively for element image $EMM_{11}$ in FIG. 6. Then, a maximum width $LX_{Ei}$ (in FIG. 6 maximum width $LX_{E1}$) in the direction of the $X_E$ is used as the size information for element image $EMM_{ji}$. In FIG. 6, the element image $EMM_{ji}$ has been made as a heart shaped element image $EMM_{11}$, but the same applies even if it is an element image of a different shape or size.

Example of display designation descriptors for the above described display designation file $41_j$ are shown in FIG. 7, FIG. 8A and FIG. 8B. Note that, the display designation descriptors of this embodiment are described in a format conforming to the SMIL (Synchronized Multimedia Integration Language) format.

In FIG. 7, an example for carrying out display designation to display the same element image steadily as two positions (for example, positions of two eyes in the case where the noted image is a facial image of a specified person) fixed in accordance with position, inclination and size of the noted image region is shown as the display designation file $41_1$. Specifically, display of additional image 1 and additional image 2, designated by <additional image 1 designation> and <addition image 2 designation> described between <simultaneous display designation> and <end simultaneous display designation> is designated.

Additional image 1 is designated using the descriptors between <additional image 1 designation> and <end additional image 1 designation>. Specifically, element image $EMM_{11}$ designated by "element image designation" is display at a coordinate position $(X_{W11}, Y_{W11})$ of the $X_W Y_W$ coordinate system in the case where size information for the noted image region WMR is a value $LX_{W0}$ constituting a predetermined reference, as designated using "display position designation". Also, as designated by "size designation", a maximum width in a $X_W$ axis direction of the element image $EMM_{11}$ at the time of display is made a length of proportion $R_1$ with respect to size $LX_W$ of the noted image region WMR. Note that, from the fact that display time designation, which will be described later, is not carried out, the element image $EMM_{11}$ for additional image 1 is designated to be displayed continuously.

Additional image 2 is designated using the descriptors between <additional image 2 designation> and <end additional image 2 designation>. Specifically, element image $EMM_{11}$ designated by "element image designation" is display at a coordinate position $(X_{W12}, Y_{W12})$ of the $X_W Y_W$ coordinate system in the case where size information for the noted image region WMR is a value $LX_{W0}$ constituting a predetermined reference, as designated using "display position designation". With respect to designation other than this, the same display designation as for the case of additional image 1 is carried out because the same designations as for the case of additional image 1 are carried out.

Note that, in the case of the display designation file $41_1$ as in FIG. 7, only element image $EMM_{11}$ is stored in the element image file $42_1$ corresponding to the display designation file $41_1$, as an element image.

In FIG. 8A, an example for carrying out display designation to display the one additional image 1 whose display contents vary with time at a single position (for example, position of a mouth in the case where the noted image is a facial image of a specified person) fixed in accordance with position, inclination and size of the noted image region is shown as the display designation file $41_2$. With the display designation file $41_2$ of FIG. 8A, a plurality of element images can not be displayed at the same time, which means that <simultaneous display designation> and <end simultaneous display designation> relating to the simultaneous display in FIG. 7 are not described.

Additional image 1 is designated using the descriptors between <additional image 1 designation> and <end additional image 1 designation>. Specifically, first of all an element image $EMM_{21}$ designated by a first "element image designation" is displayed at a coordinate position $(X_{W21}, Y_{W21})$ of the $X_W Y_W$ coordinate system in the case where size information $LX_E$ for a noted image region designated using a first "display position designation" is a value $LX_{E0}$ constituting a predetermined reference. Also, as designated by the first "size designation", a maximum width in a $X_E$ axis direction of the element image $EMM_2$, at the time of display is made a length of proportion $R_{21}$ with respect to size $LX_W$ of the noted image region WMR. Also, as designated by the first "display time designation", the element image $EMM_{21}$ is displayed for a time $T_{21}$.

If display of element image $EMM_{21}$ for time $T_{21}$ is completed, next an element image $EMM_{22}$ designated using a second "element image designation" is displayed at a position designated using a second "display position designation", that is, at the same position as for the case of element image $EMM_{21}$. Also, as designated by the second "size designation", a maximum width in a $X_E$ axis direction of the element image $EMM_{22}$ at the time of display is made a length of proportion $R_{22}$ with respect to size $LX_W$ of the noted image region WMR. Further, as designated by the second "display time designation", the element image $EMM_{22}$ is displayed for a time $T_{22}$.

If display of element image $EMM_{22}$ for time $T_{22}$ is completed, next an element image $EMM_{23}$ designated using a third "element image designation" is displayed at a position designated using a third "display position designation", that is, at the same position as for the case of element image $EMM_{21}$. Also, as designated by the third "size designation", a maximum width in a $X_E$ axis direction of the element image $EMM_{23}$ at the time of display is made a length of proportion $R_{23}$ with respect to size $LX_W$ of the noted image region WMR. Further, as designated by the third "display time designation", the element image $EMM_{23}$ is displayed for a time $T_{23}$.

If display of the element image $EMM_{21}$, element image $EMM_{22}$, and element image $EMM_{23}$, in time sequence in this way is completed, the element image $EMM_{21}$, element image $EMM_{22}$, and element image $EMM_{23}$ are displayed again in time sequence under the same conditions as described above. Display of the element image $EMM_{21}$, element image $EMM_{22}$, and element image $EMM_{23}$ in this way using designation conditions is repeated in time order.

An example for carrying out display designation in order to display one element image all the time at a single position fixed in accordance with position, inclination and size of the noted image region, and also displaying two different element images selectively in time order at two other positions determined in accordance with position, inclination and size of the noted image region is shown in FIG. 8B as an example of a display designation file 413. Specifically, display of additional image 1 and addition image 2, designated by <additional image 1 designation> and <additional image 2 designation> described between <simultaneous display designation> and <end simultaneous display designation> is designated.

Additional image 1 is designated using the descriptors between <additional image 1 designation> and <end additional image 1 designation>. Specifically, element image $EMM_3$, designated by "element image designation" is displayed at a coordinate position $(X_{W31}, Y_{W31})$ of the $X_W Y_W$ coordinate system in the case where size information for the noted image region WMR is a value $LX_{W0}$ constituting a predetermined reference, as designated using "display position designation". Also, as designated by "size designation", a maximum width in a $X_W$ axis direction of the element image $EMM_{31}$ at the time of display is made a length of proportion $R_{31}$ with respect to size $LX_W$ of the noted image region WMR. Note that, because display time designation is not carried out, the element image $EMM_{31}$ for additional image 1 is designated to be displayed continuously.

Additional image 2 is designated using the descriptors between <additional image 2 designation> and <end additional image 2 designation>. Specifically, first of all an element image $EMM_{32}$ designated by a first "element image designation" is displayed at a coordinate position $(X_{W32}, Y_{W32})$ of the $X_W Y_W$ coordinate system in the case where size information for a noted image region WMR, as designated using a first "display position designation", is a value $LX_{W0}$ constituting a predetermined reference. Also, as designated by "size designation", a maximum width in a $X_W$ axis direction of the element image $EMM_{32}$ at the time of display is made a length of proportion $R_{32}$ with respect to size $LX_W$ of the noted image region WMR. Also, as designated by the first "display time designation", the element image $EMM_{32}$ is displayed for a time $T_{32}$.

With respect to additional image 2, if display of element image $EMM_{32}$ for $T_{32}$ is completed, next an element image $EMM_{33}$ designated by a second "element image designation" is displayed at a coordinate position $(X_{W33}, Y_{W33})$ of the $X_W Y_W$ coordinate system in the case where size information for a noted image region WMR, as designated using a second "display position designation", is a value $LX_0$ constituting a predetermined reference. Also, as designated by "size designation", a maximum width in a $X_W$ axis direction of the element image $EMM_{33}$ at the time of display is made a length of proportion $R_{33}$ with respect to size $LX_W$ of the noted image region WMR. Further, as designated by the second "display time designation", the element image $EMM_{33}$ is displayed for a time $T_{33}$.

Simultaneous display of element image $EMM_{31}$ and element image $EMM_{32}$, and simultaneous display of element image $EMM_{31}$ and element image $EMM_{33}$, by combining additional image 1 and additional image 2 in this way, are carried in time sequence. If these displays are completed, simultaneous display of element image $EMM_{31}$ and element image $EMM_{32}$, and simultaneous display of element image $EMM_{31}$ and element image $EMM_{33}$, are again carried out in time sequence under the same conditions as described above. Simultaneous display of element image $EMM_{31}$ and element image $EMM_{32}$, and simultaneous display of element image $EMM_{31}$ and element image $EMM_{33}$ in this way, are repeatedly carried out in time sequence.

In the following description will be given of the operation of forming a composite image with a mask image superimposed on an original image, in the portable telephone unit constructed as described above.

Figure 9A:
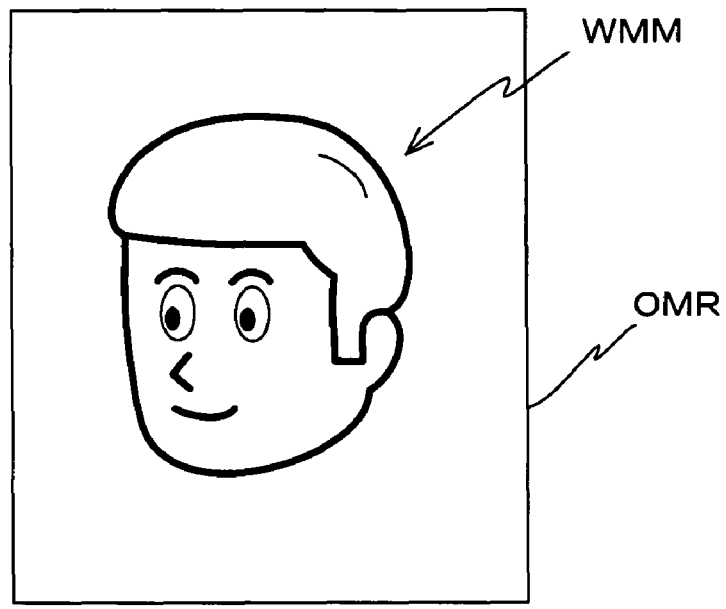
FIG. 9A is a drawing showing an example of a noted image.
Figure 9B:
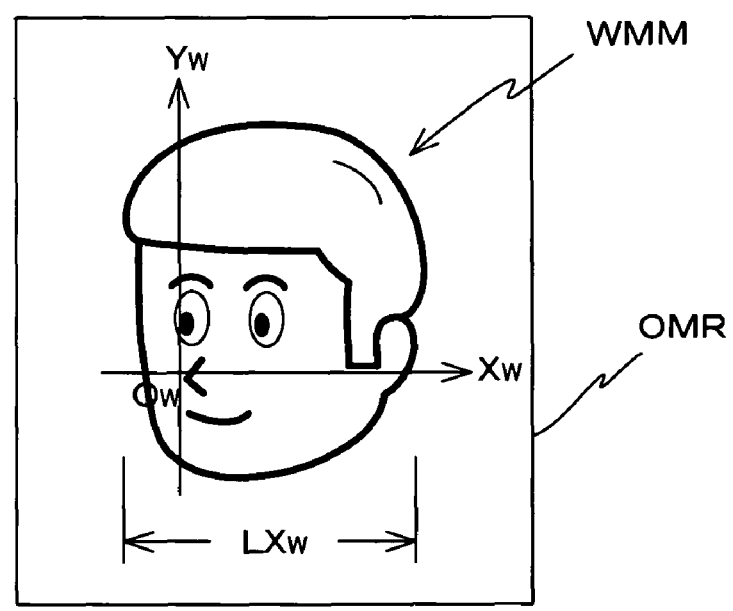
FIG. 9B is a drawing showing an example for describing the noted image coordinate system in FIG. 9A.

As a prerequisite, the mask image formation section 32 has already read out contents of the mask information file 40 in the storage section 23 as mask image information MDD. Also, the original image is an image that is formed on an imaging screen of the imaging element 25 by means of the imaging optical system 18 and the switching optical system 24. The noted image WMM is a facial image of a specified person, such as shown in FIG. 9A. Then, as shown in FIG. 9B, a tip position of a nose in the noted image WMM is made an origin $O_W$, a direction connecting both sides is made an $X_W$ axis direction, and an $X_W Y_W$ coordinate system (noted image coordinate system) with a direction orthogonal to the $X_W$ axis direction being a $Y_W$ axis direction is defined. Note that, the origin $O_W$ and the $X_W$ axis direction are obtained by analyzing the noted image in the original image, and the $Y_W$ axis direction is obtained based on the obtained $X_W$ axis direction.

FIRST COMPOSITE IMAGE FORMATION EXAMPLE

First of all, a first composite image formation method will be described. This example, in FIG. 7 described above, is an example of a composite image having a position of two eyes as display positions, and element image $EMM_{11}$ being the heart shaped graphic image shown in FIG. 6, for displaying a mask image that is the element image $EMM_{11}$ displayed in a size of proportion $R_1$ with respect to length value $LX_W$ representing size of noted image WMM, superimposed on an original image.

Figure 10A:
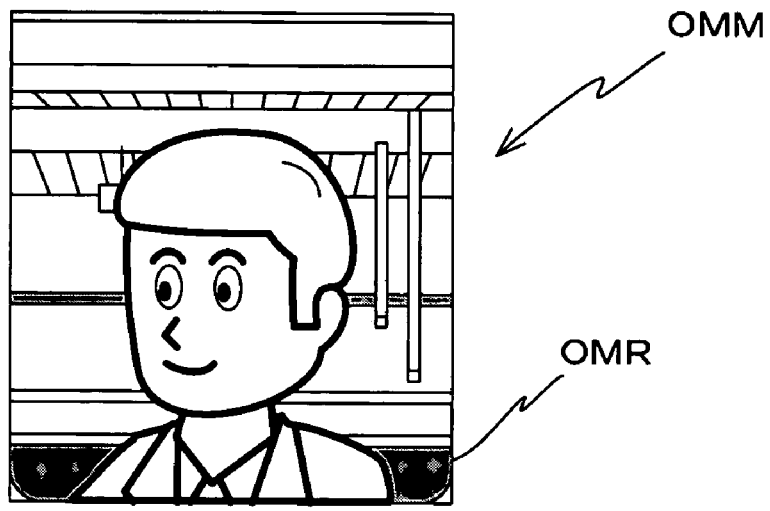
FIG. 10A is a drawing showing an example of an original image.

First of all, original image data OMD, being data for an original image OMM imaged on the imaging element 25, is notified to the noted image information extraction section 31. Note that, the original image data OMD is also notified to the composite image formation section 33 at the same time (refer to FIG. 3). In this case, the acquired original image OMM is shown in FIG. 10A.

The noted image information extraction section 31 image processes the notified original image OMM to extract a region of the noted image WMM. Continuing on, the noted image information extraction section 31 analyzes the noted image WMM, to obtain a position of a tip of a nose $(X_{SW}, Y_{SW})$ in the noted image WMM of the original image coordinate system $(X_S Y_S$ coordinate system) as a position of an origin $O_W$ for the noted image coordinates $(X_W Y_W$ coordinate system), and obtain a direction in which a line segment linking two central position of pupils of two eyes extends as an $X_W$ axis direction for the $X_W Y_W$ coordinate system. A crossing angle $\theta_W$ of the obtained $X_W$ axis direction and the $X_S$ axis direction is then obtained. Further, the noted image information extraction section 31 obtains a width $LX_W$ of the noted image WMM on the $X_W$ axis. The noted image information extraction section 31 then notifies position $(X_{SW}, Y_{SW})$ as position information for the noted image region, angle $\theta_W$ as inclination information for the noted image region, and length $LX_W$ as size information of the noted image region to the mask image formation section 32 as noted image information data WMD.

The mask image formation section 32 that has received the noted image information data WMD first of all calculates display position $(X_{E11}, Y_{E11})$ in the $X_S Y_S$ coordinate system of the element image $EMM_{11}$ in the additional image 1, using the following equations (1) and (2).

$$X_{E11}=(LX_W/LX_0)(X_{W11}*\cos\theta_W+Y_{W11}*\sin\theta_W)+X_{SW} \quad (1)$$

$$Y_{E11}=(LX_W/LX_0)(-X_{W11}*\sin\theta_W+Y_{W11}*\cos\theta_W)+Y_{SW} \quad (2)$$

Next the mask image formation section 32 calculates a magnification $M_{11}$ for expansion or contraction of the element image $EMM_{11}$ in the additional image 1 from the following equation (3).

$$M_{11}=R_1*LX_W/LX_{E1} \quad (3)$$

Next, the mask image formation section 32 carries out expansion or contraction of the element image $EMM_{11}$ with a magnification $M_{11}$ and with origin $O_E$ as a center in the $X_S Y_S$ coordinate system. Continuing on, the mask image formation section 32 rotates the expanded or contracted element image $EMM_{11}$ by angle $\theta_W$ with origin $O_E$ as a center in the $X_S Y_S$ coordinate system. The element image $EMM_{11}$ that has been expanded or contracted and rotated is then arranged in the $X_S Y_S$ coordinate system so that a coordinate position $(X_{E11}, Y_{E11})$ in the $X_S Y_S$ coordinate system becomes the position of the origin $O_E$.

Next, similarly to the case for additional image 1, the mask image formation section 32 calculates display position $(X_{E12}, Y_{E21})$ in the $X_S Y_S$ coordinate system of the element image $EMM_{11}$ in the additional image 2, using the following equations (4) and (5).

$$X_{E12}=(LX_W/LX_0)(X_{W12}*\cos\theta_W+Y_{W12}*\sin\theta_W)+X_{SW} \quad (4)$$

$$Y_{E12}=(LX_W/LX_0)(-X_{W12}*\sin\theta_W+Y_{W12}*\cos\theta_W)+Y_{SW} \quad (5)$$

Next, similarly to the case for additional image 1, the mask image formation section 32 calculates a magnification $M_{12}$ for expansion or contraction of the element image $EMM_{11}$ in the additional image 2 from the following equation (6).

$$M_{12}=R_1*LX_W/LX_{E1} \quad (6)$$

Next, the mask image formation section 32 carries out expansion or contraction of the element image $EMM_{11}$ with a magnification $M_{12}$ and with origin $O_E$ a center in the $X_S Y_S$ coordinate system as. Continuing on, the mask image formation section 32 rotates the expanded or contracted element image $EMM_{11}$ by angle $\theta_W$ with origin $O_E$ as a center in the $X_S Y_S$ coordinate system. The element image $EMM_{11}$ that has been expanded or contracted and rotated is then arranged in the $X_S Y_S$ coordinate system so that a coordinate position $(X_{E12}, Y_{E12})$ in the $X_S Y_S$ coordinate system becomes the position of the origin $O_E$.

Figure 10B:
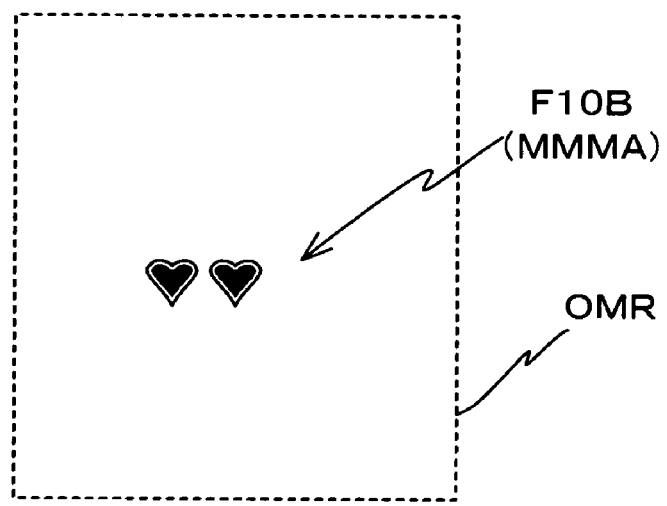
FIG. 10B is a first drawing showing an example of a mask image.
Figure 11:
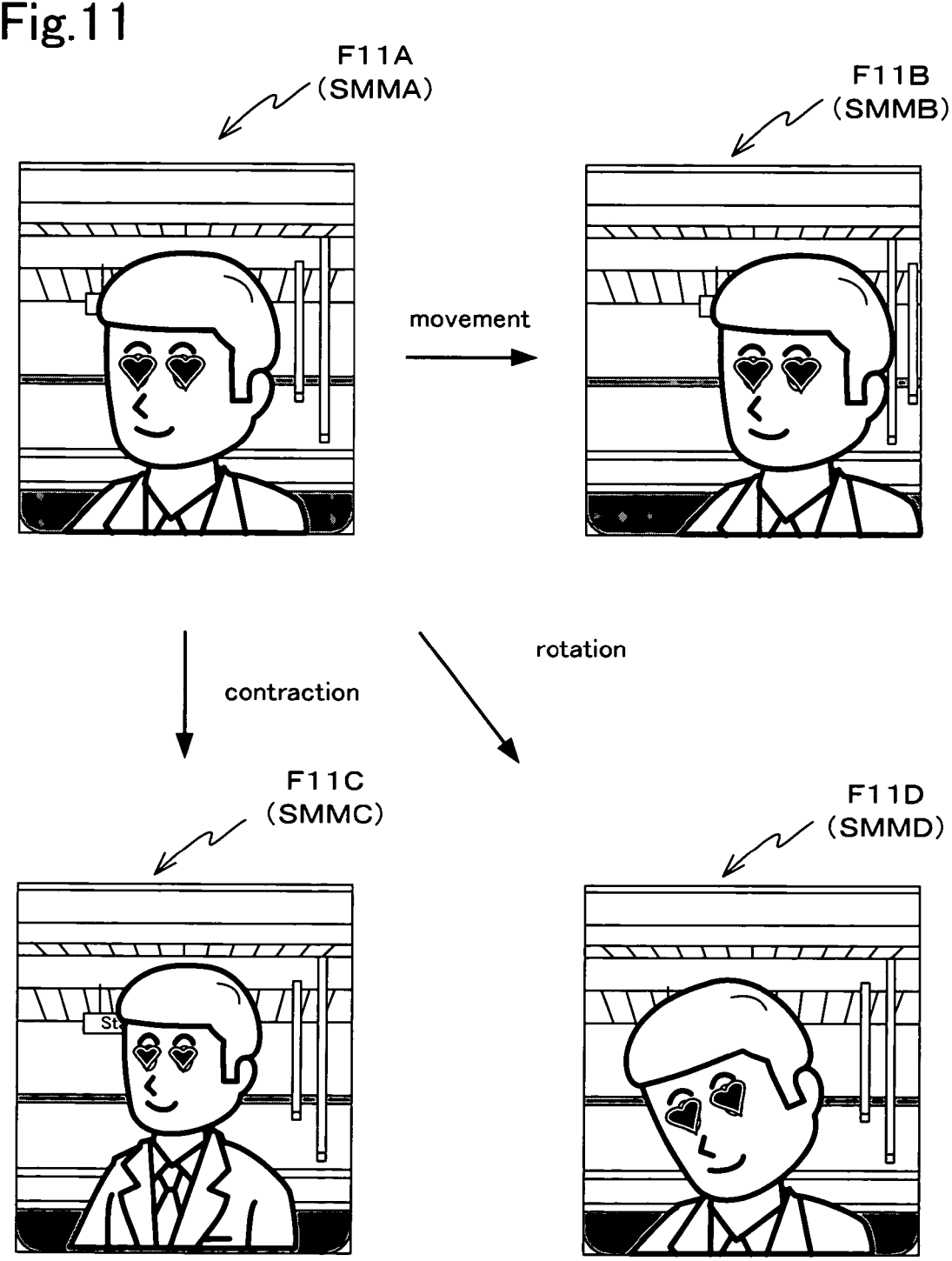
FIG. 11 is a first drawing showing an example of a composite image of the first embodiment.
Figure 12A:
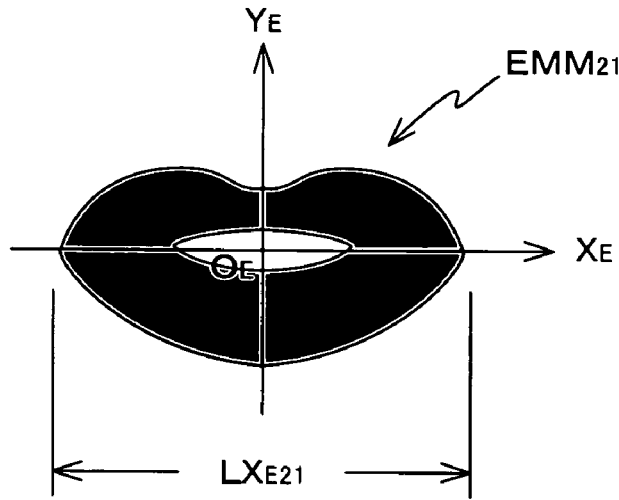
FIG. 12A is a second drawing showing an example of an element image.
Figure 12B:
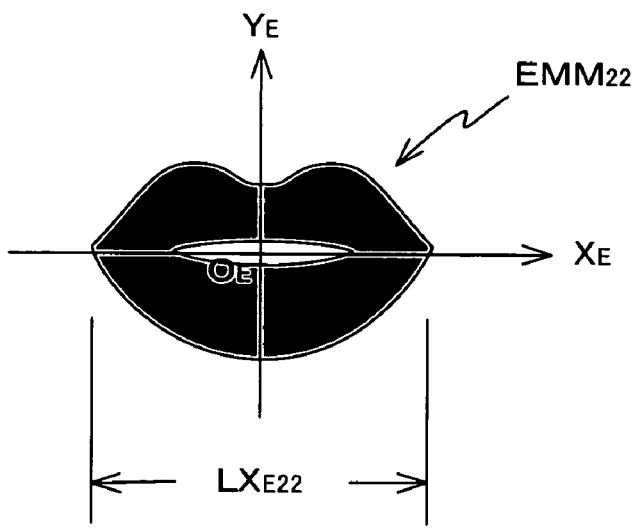
FIG. 12B is a third drawing showing an example of an element image.
Figure 12C:
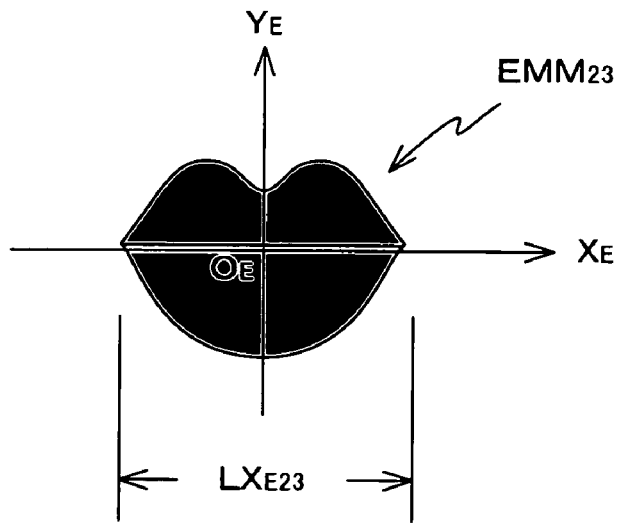
FIG. 12C is a fourth drawing showing an example of an element image.

The result of the above processing is that a mask image MMMA such as is shown by image F10B in FIG. 10B is formed. The mask image formation section 32 then notifies data of the mask image MMMA to the composite image formation section 33 as mask image data MMD.

The composite image formation section 33 that has received the mask image data MMD and the original image data OMD forms a composite image SMMA having the mask image MMMA superimposed on the original image data OMM. The composite image SMMA formed in this way is represented as image F11A in FIG. 11.

As described above, the composite image for the case of this example is formed. Therefore, even if the noted image WMM of the original image is moved parallel from the above described example during imaging, as shown in image F11B, the same as with the above described case a composite image SMMB is formed having a mask image with the element image $EMM_{11}$ displayed at size that is a proportion designated according to size of the noted image region at a position of two eyes in the noted image WMM superimposed on the original image.

Also, even if the noted image WMM of the original image is contracted during imaging, as shown in image F11C, the same as with the above described case a composite image SMMC is formed having a mask image with the element image $EMM_{11}$ displayed at size that is a proportion designated according to size of the noted image region at a position of two eyes in the noted image WMM superimposed on the original image. Also, even if the noted image WMM of the original image is rotated during imaging, as shown in image F11D, the same as with the above described case a composite image SMMD is formed having a mask image with the element image $EMM_{11}$ displayed having a size that is a proportion designated according to size of the noted image region at a position of two eyes in the noted image WMM, and having the same inclination as the inclination of the noted image WMM within in the original image, superimposed on the original image. Note that, when the noted image WMM in the original image is contracted, expanded or rotated during imaging, it is generally accompanied by change in coordinate position in the original image coordinate system ($X_S Y_S$ coordinate system) for nose tip position in the noted image region.

SECOND COMPOSITE IMAGE FORMATION EXAMPLE

Next, a second composite image formation method will be described. This example is an example of a composite image where, in FIG. 8A described above, a mask image having element image $EMM_{21}$ shown in FIG. 12A, element image $EMM_{22}$ shown in FIG. 12B and element image $EMM_{23}$ shown in FIG. 12C displayed in time sequence, with the position of a mouth as display position, is superimposed on the original image.

Note that, element images $EMM_{21}$, $EMM_{22}$ and $EMM_{23}$ are displayed in a size corresponding to "size information" being designated by the descriptor of FIG. 8A. Specifically, element image $EMM_{21}$ is displayed in a size of proportion $R_{21}$ with respect to length value $LX_W$ representing size of the noted image WMM. Also, element image $EMM_{22}$ is displayed in a size of proportion $R_{22}$ with respect to length value $LX_W$. Further, element image $EMM_{23}$ is displayed in a size of proportion $R_{23}$ with respect to length value $LX_W$.

First of all, similarly to the first composite image forming example described above, data for an original image OMM imaged on the imaging element 25 is notified to the noted image information extraction section 31 as original image data OMD. Continuing on, the noted image extraction section 31 carries out image processing of the notified original image OMM and extracts the noted image information WMR specifying the region of the noted image WMM. The noted image information extraction section 31 then notifies position ($X_{SW}$, $Y_{SW}$) as position information for the noted image region, angle $\theta_W$ as inclination information for the noted image region, and length $LX_W$ as size information of the noted image region to the mask image formation section 32 as noted image information data WMD.

The mask image formation section 32 that has received the noted image information data WMD first of all calculates display position ($X_{E2}, Y_{E2}$) in the $X_S Y_S$ coordinate system of the first element image $EMM_{21}$ in the additional image 1, using the following equations (7) and (8).

$$X_{E2}=(LX_W/LX_0)(X_{W2}*\cos\theta_W+Y_{W2}*\sin\theta_W)+X_{SW} \quad (7)$$

$$Y_{E2}=(LX_W/LX_0)(-X_{W2}*\sin\theta_W+Y_{W2}*\cos\theta_W)+Y_{SW} \quad (8)$$

Next the mask image formation section 32 calculates a magnification $M_{21}$ for expansion or contraction of the first element image $EMM_{21}$ from the following equation (9).

$$M_{21}=R_{21}*LX_W/LX_{E21} \quad (9)$$

Next, similarly to the first composite image formation described above, the mask image formation section 32 carries out expansion or contraction of the element image $EMM_{21}$ with a magnification $M_{21}$ and with origin $O_E$ as a center in the $X_S Y_S$ coordinate system. Continuing on, the mask image formation section 32 rotates the expanded or contracted element image $EMM_2$, by angle $\theta_W$ with origin $O_E$ in the $X_S Y_S$ coordinate system as a center. The element image $EMM_{21}$ that has been expanded or contracted and rotated is then arranged in the $X_S Y_S$ coordinate system so that a coordinate position ($X_{E2}, Y_{E2}$) in the $X_S Y_S$ coordinate system becomes the position of the origin $O_E$.

Figure 13:
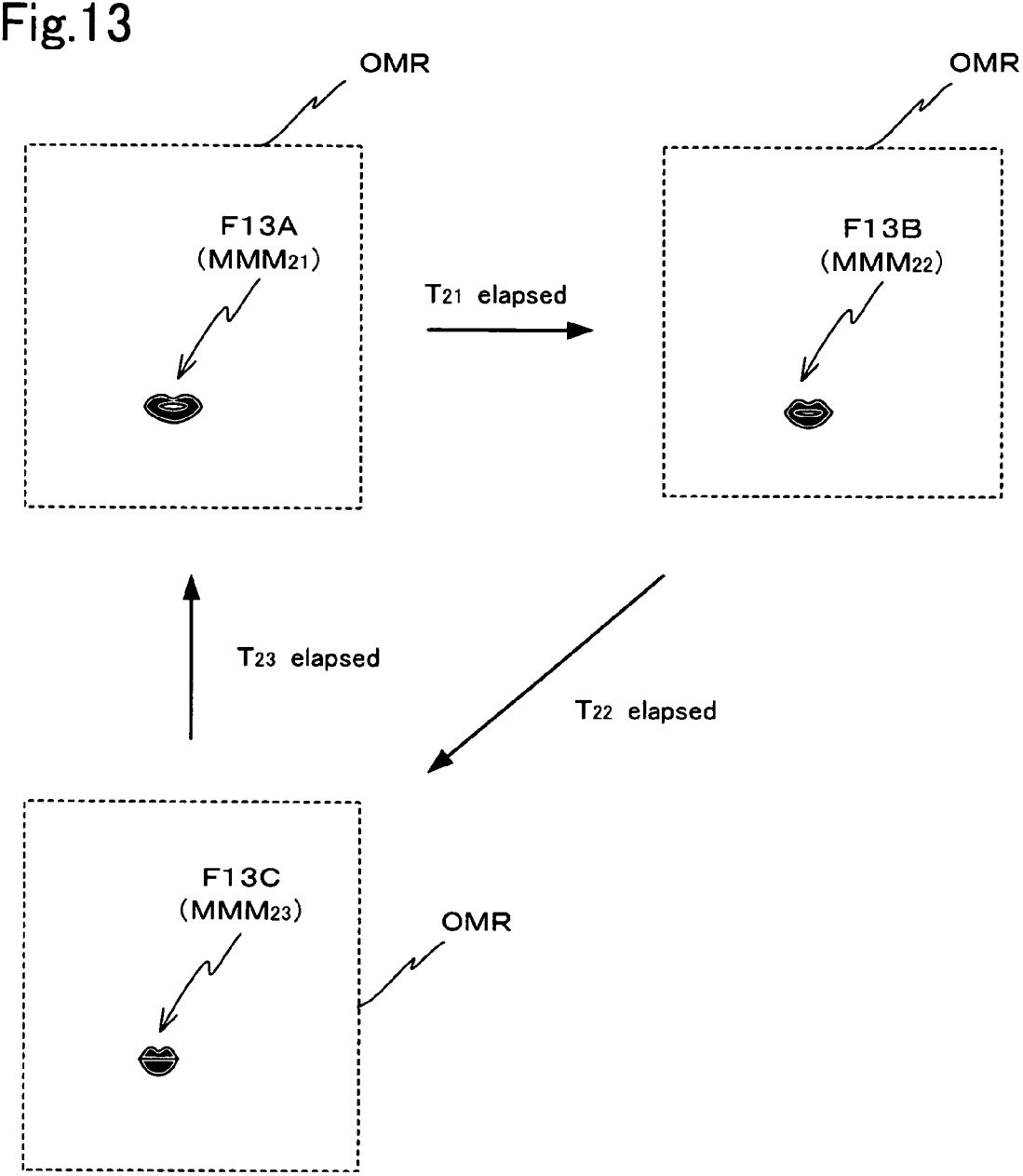
FIG. 13 is a second drawing showing an example of a mask image.
Figure 14:
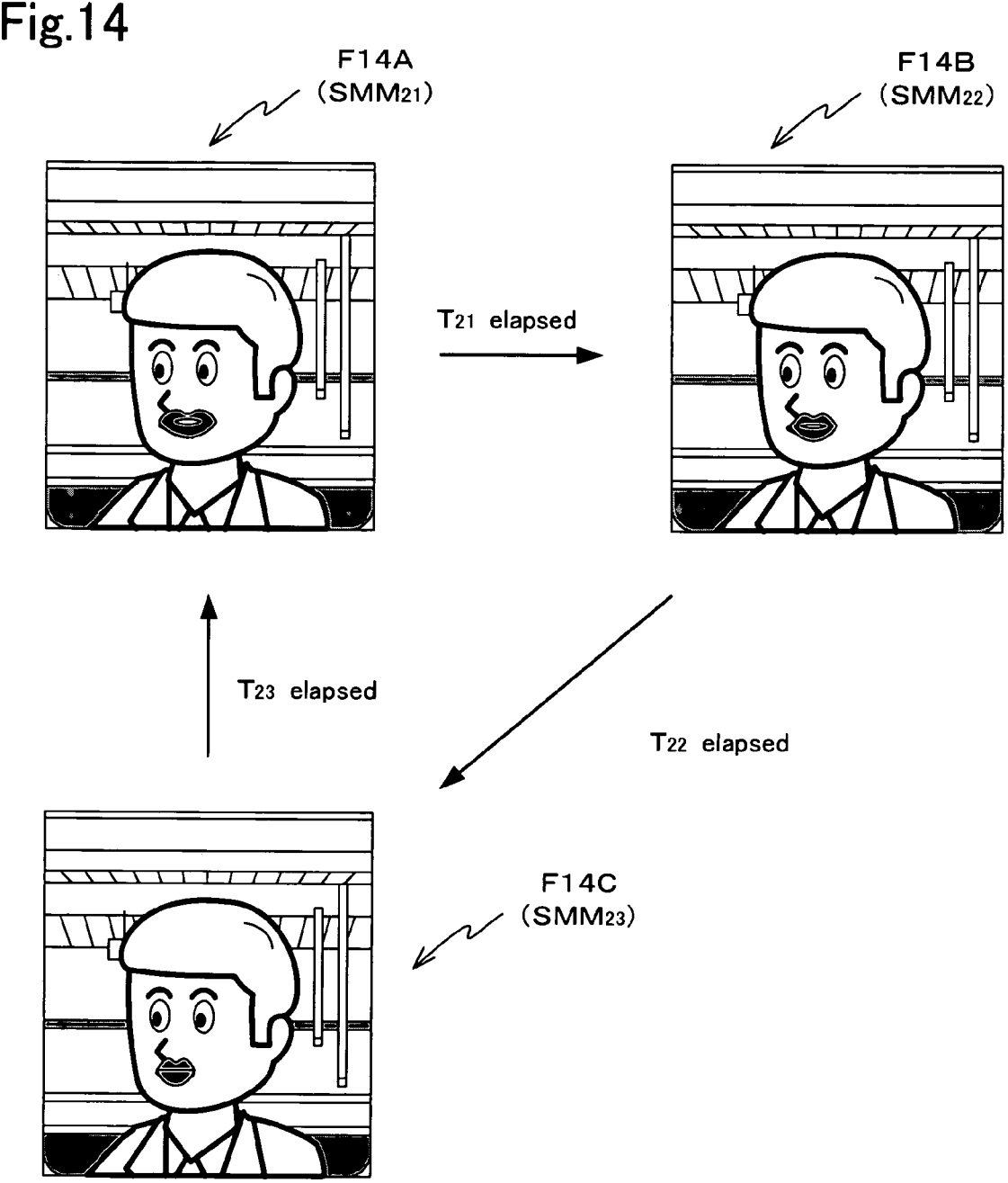
FIG. 14 is a second drawing showing an example of a composite image of the first embodiment.

The result of the above processing is that a mask image $MMM_{21}$ such as is shown by image F13A in FIG. 13 is formed. The mask image formation section 32 then notifies data of the mask image $MMM_{21}$ to the composite image formation section 33 as mask image data MMD.

The composite image formation section 33 that has received this mask image data MMD and the original image data OMD forms a composite image $SMM_{21}$ having the mask image MMM superimposed on the original image OMM. The composite image $SMM_{21}$ formed in this way is represented as image F14A in FIG. 14.

After that, during time $T_{21}$, the mask image formation section 32 forms the mask image displaying element image $EMM_{21}$ in a size of proportion $R_{21}$ with respect to length value $LX_W$ representing the size of the noted image WMM, with mouth position in the noted image WMM as display position. As a result, during time $T_{21}$, the composite image formation section 33 sequentially forms the composite image having the mask image that is the element image $EMM_{21}$ that has been expanded or contracted at magnification $M_{21}$ at the position of the mouth in the noted image WMM of the original image.

In this manner, once time $T_{21}$ has elapsed, the mask image formation section 32 calculates display position $(X_{E2}, Y_{E2})$ in the $X_S Y_S$ coordinate system of the second element image $EMM_{22}$ in the additional image 1, using the above described equations (7) and (8). Continuing on, the mask image formation section 32 calculates a magnification M22 for expansion or contraction of the second element image $EMM_{22}$ from the following equation (10).

$$M_{22}=R_{22}*LX_W/LX_{E22} \qquad (10)$$

Next, similarly to the case of the first element image $EMM_{21}$ described above, the mask image formation section 32 carries out expansion or contraction of the element image $EMM_{22}$ with a magnification $M_{22}$ and with origin $O_E$ as a center in the $X_E Y_E$ coordinate system. Continuing on, the mask image formation section 32 rotates the expanded or contracted element image $EMM_{22}$ by angle $\theta_W$ with origin $O_E$ as a center in the $X_S Y_S$ coordinate system. The element image $EMM_{22}$ that has been expanded or contracted and rotated is then arranged in the $X_S Y_S$ coordinate system so that a coordinate position $(X_{E2}, Y_{E2})$ in the $X_S Y_S$ coordinate system becomes the position of the origin $O_E$.

The result of the above processing is that a mask image $MMM_{22}$ such as is shown by image F13B in FIG. 13 is formed. The mask image formation section 32 then notifies data of the mask image $MMM_{22}$ to the composite image formation section 33 as mask image data MMD.

The composite image formation section 33 that has received this mask image data MMD and the original image data OMD forms a composite image $SMM_{22}$ having the mask image MMM superimposed on the original image OMM. The composite image $SMM_{22}$ formed in this way is represented as image F14B in FIG. 14.

After that, during time $T_{22}$, the mask image formation section 32 forms the mask image displaying element image $EMM_{22}$ in a size of proportion $R_{22}$ with respect to length value $LX_W$ representing the size of the noted image WMM, with mouth position in the noted image WMM as display position. As a result, during time $T_{22}$ the composite image formation section 33 forms the composite image having the mask image that is the element image $EMM_{22}$ that has been expanded or contracted at magnification $M_{22}$ at the position of the mouth in the noted image WMM of the original image.

In this manner, once time $T_{22}$ has elapsed, the mask image formation section 32 calculates display position $(X_{E2}, Y_{E2})$ in the $X_S Y_S$ coordinate system of the third element image $EMM_{23}$ in the additional image 1, using the above described equations (7) and (8). Continuing on, the mask image formation section 32 calculates a magnification $M_{23}$ for expansion or contraction of the second element image $EMM_{23}$ from the following equation (11).

$$M_{23}=R_{23}*LX_W/LX_{E23} \qquad (11)$$

Next, similarly to the case of the first element image $EMM_{21}$ described above, the mask image formation section 32 carries out expansion or contraction of the element image $EMM_{23}$ with a magnification $M_{23}$ and with origin $O_E$ as a center in the $X_E Y_E$ coordinate system. Continuing on, the mask image formation section 32 rotates the expanded or contracted element image $EMM_{23}$ by angle $\theta_W$ with origin $O_E$ as a center in the $X_S Y_S$ coordinate system. The element image $EMM_{23}$ that has been expanded or contracted and rotated is then arranged in the $X_S Y_S$ coordinate system so that a coordinate position $(X_{E2}, Y_{E2})$ in the $X_S Y_S$ coordinate system becomes the position of the origin $O_E$.

The result of the above processing is that a mask image $MMM_{23}$ such as is shown by image F13C in FIG. 13 is formed. The mask image formation section 32 then notifies data of the mask image $MMM_{23}$ to the composite image formation section 33 as mask image data MMD.

The composite image formation section 33 that has received this mask image data MMD and the original image data OMD forms a composite image $SMM_{23}$ having the mask image $MMM_{23}$ superimposed on the original image OMM. The composite image $SMM_{23}$ formed in this way is represented as image F14C in FIG. 14.

After that, during time $T_{23}$, the mask image formation section 32 forms the mask image displaying element image $EMM_{23}$ in a size of proportion $R_{23}$ with respect to length value $LX_W$ representing the size of the noted image WMM, with mouth position in the noted image WMM as display position. As a result, during time $T_{23}$ the composite image formation section 33 forms the composite image having the mask image that is the element image $EMM_{23}$ that has been expanded or contracted at magnification $M_{23}$ at the position of the mouth in the noted image WMM of the original image.

In this manner, once time T23 has elapsed, the mask image formation section 32, similarly to above, repeatedly forms the mask image that uses the above described element image $EMM_{21}$, the mask image that uses the element image $EMM_{22}$, and the mask image that uses the element image $EMM_{23}$, in time sequence. The composite image formation section 33 then sequentially forms composite images with mask images comprised of the element image EMM21, element image EMM22 and element image EMM23 that have been expanded or contracted to a designated size superimposed at a position of a mouth of the noted image in the original image, based on original image data OMD and mask image data MMD.

THIRD COMPOSITE IMAGE FORMATION EXAMPLE

Next, a third composite image formation method will be described. This example corresponds to the mask image designation of FIG. 8 described above, and is an example of a composite image that displays a mask image, in which an additional image 1 that is displayed in a steady manner at a display position corresponding to an element image and a noted image, and an additional image 2 that is displayed at a display position that changes with time corresponding to an element image and a noted image, are displayed simultaneously, superimposed on an original image.

Figure 15A:
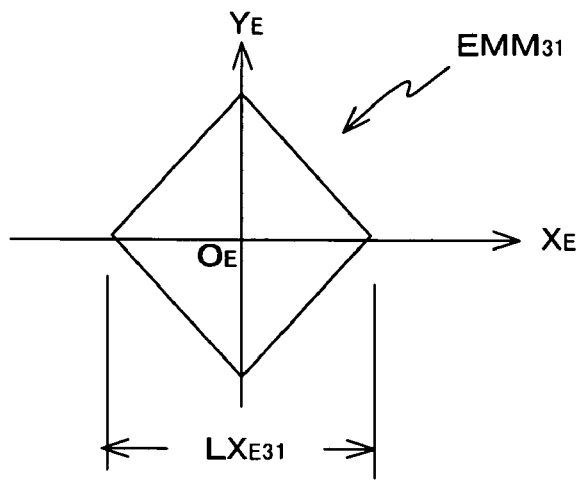
FIG. 15A is a fifth drawing showing an example of an element image.
Figure 15B:
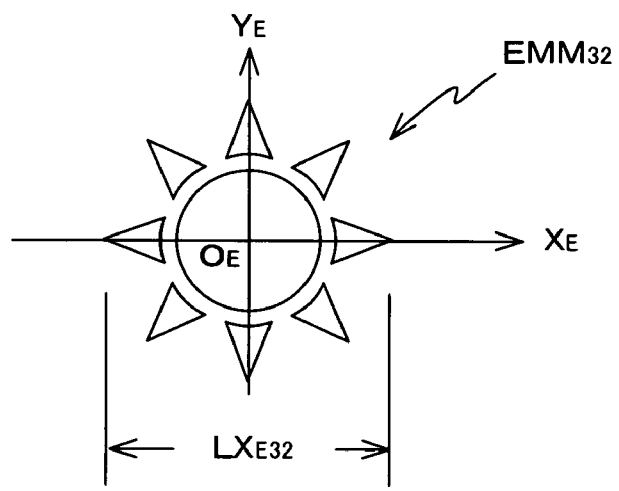
FIG. 15B is a sixth drawing showing an example of an element image.
Figure 15C:
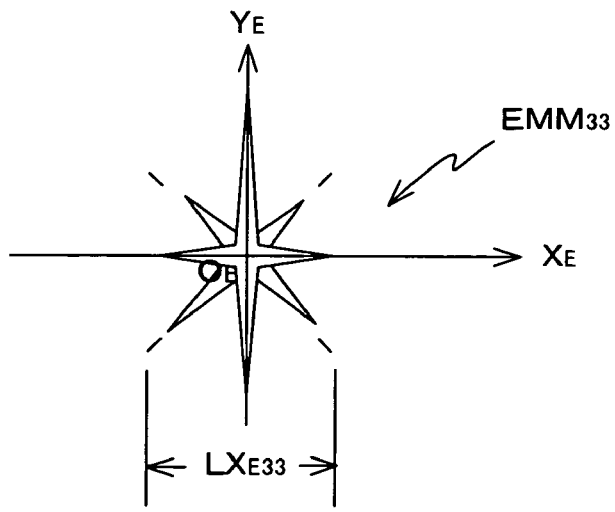
FIG. 15C is a seventh drawing showing an example of an element image.

In this matter, the element image $EMM_{31}$ for the additional image 1 is shown in FIG. 15A. Also, the first element image $EMM_{32}$ for the additional image 2 is shown in FIG. 15B, and the second element image $EMM_{33}$ for the additional image 2 is shown in FIG. 15C.

Note that, element images $EMM_{31}$, $EMM_{32}$ and $EMM_{33}$ are displayed in a size corresponding to "size information" being designated by the descriptor of FIG. 8. Specifically, element image $EMM_{31}$ is displayed in a size of proportion $R_{31}$ with respect to length value $LX_W$ representing size of the noted image WMM. Also, element image $EMM_{32}$ is displayed in a size of proportion $R_{32}$ with respect to length value $LX_W$. Further, element image $EMM_{33}$ is displayed in a size of proportion $R_{33}$ with respect to length value $LX_W$ representing size of the noted image WMM.

First of all, similarly to the first and second composite image formation described above, original image data OMD imaged on the imaging element 25 is notified to the noted image information extraction section 31. Continuing on, the noted image extraction section 31 carries out image processing of the notified original image OMM and extracts the noted image information specifying the region of the noted image WMM. The noted image information extraction section 31 then notifies position $(X_{SW}, Y_{SW})$ as position information for the noted image region, angle $\theta_W$ as inclination information for the noted image region, and length $LX_W$ as size information of the noted image region to the mask image formation section 32 as noted image information data WMD.

The mask image formation section 32 that has received the noted image information data WMD first of all calculates display position $(X_{E31}, Y_{E31})$ in the $X_S Y_S$ coordinate system of the first element image $EMM_{31}$ in the additional image 1, using the following equations (12) and (13).

$$X_{E31} = (LX_W/LX_0)(X_{W31} * \cos\theta_W + Y_{W31} * \sin\theta_W) + X_{SW} \quad (12)$$

$$Y_{E31} = (LX_W/LX_0)(-X_{W31} * \sin\theta_W + Y_{W31} * \cos\theta_W) + Y_{SW} \quad (13)$$

Next the mask image formation section 32 calculates a magnification $M_3$, for expansion or contraction of the first element image $EMM_{31}$ from the following equation (14).

$$M_{31} = R_{31} * LX_W/LX_{E33} \quad (14)$$

Next, similarly to the first and second composite image formation described above, the mask image formation section 32 carries out expansion or contraction of the element image $EMM_{31}$ with a magnification $M_{31}$ and with origin $O_E$ as a center in the $X_E Y_E$ coordinate system. Continuing on, the mask image formation section 32 rotates the expanded or contracted element image $EMM_3$, by angle $\theta_W$ with origin $O_E$ as a center in the $X_S Y_S$ coordinate system. The element image $EMM_{31}$ that has been expanded or contracted and rotated is then arranged in the $X_S Y_S$ coordinate system so that a coordinate position $(X_{E31}, Y_{E31})$ in the $X_S Y_S$ coordinate system becomes the position of the origin $O_E$.

Next, similarly to the case for the first element image $EMM_{31}$ of the additional image 1, the mask image formation section 32 calculates display position $(X_{E32}, Y_{E32})$ in the $X_S Y_S$ coordinate system of the second element image $EMM_{32}$ in the additional image 2, using the following equations (15) and (16).

$$X_{E32} = (LX_W/LX_0)(X_{W32} * \cos\theta_W + Y_{W32} * \sin\theta_W) + X_{SW} \quad (15)$$

$$Y_{E32} = (LX_W/LX_0)(-X_{W32} * \sin\theta_W + Y_{W32} * \cos\theta_W) + Y_{SW} \quad (16)$$

Next the mask image formation section 32 calculates a magnification $M_{32}$ for expansion or contraction of the second element image $EMM_{32}$ from the following equation (17).

$$M_{32} = R_{32} * LX_W/LX_{E32} \quad (17)$$

Next, similarly to the case of the element image $EMM_{31}$ described above, the mask image formation section 32 carries out expansion or contraction of the element image $EMM_{32}$ with a magnification $M_{32}$ and with origin $O_E$ as a center in the $X_E Y_E$ coordinate system. Continuing on, the mask image formation section 32 rotates the expanded or contracted element image $EMM_{32}$ by angle $\theta_W$ with origin $O_E$ as a center in the $X_S Y_S$ coordinate system. The element image $EMM_{31}$ that has been expanded or contracted and rotated is then arranged in the $X_S Y_S$ coordinate system so that a coordinate position $(X_{E32}, Y_{E32})$ in the $X_S Y_S$ coordinate system becomes the position of the origin $O_E$.

Figure 16:
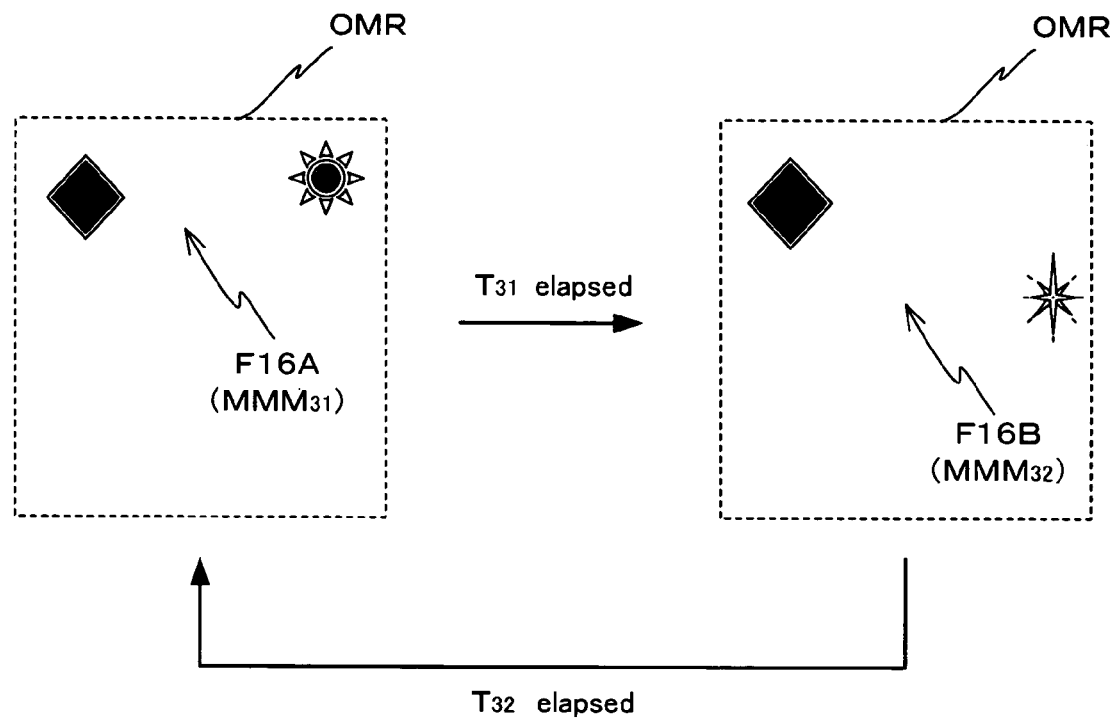
FIG. 16 is a third drawing showing an example of a mask image.
Figure 17:
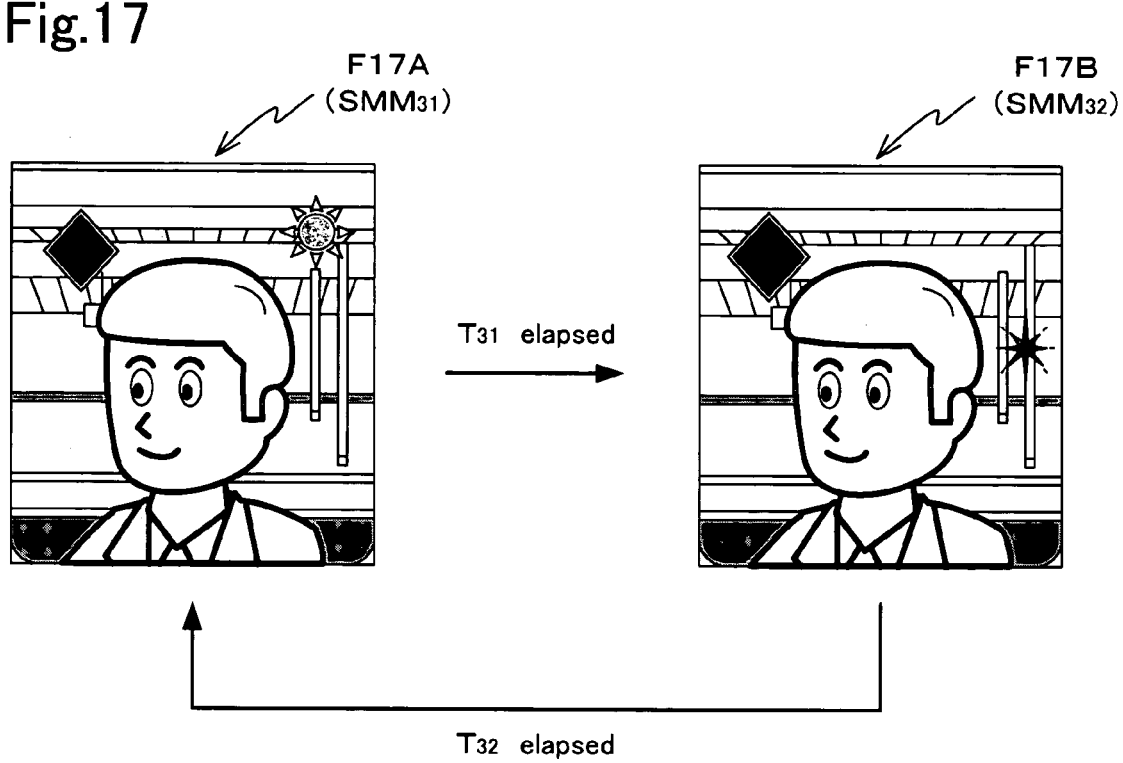
FIG. 17 is a third drawing showing an example of a composite image of the first embodiment.

The result of the above processing is that a mask image $MMM_{31}$ such as is shown by image F16A in FIG. 16 is formed. The mask image formation section 32 then notifies data of the mask image $MMM_{31}$ to the composite image formation section 33 as mask image data MMD.

The composite image formation section 33 that has received this mask image data MMD and the original image data OMD forms a composite image $SMM_{31}$ having the mask image $MMM_{31}$ superimposed on the original image OMM. The composite image $SMM_{31}$ formed in this way is represented as image F17A in FIG. 17.

After that, during time $T_{31}$, the mask image formation section 32 forms the mask image displaying element image $EMM_{31}$ in a size of proportion $R_{31}$ with respect to length value $LX_W$ representing the size of the noted image WMM, and displaying element image $EMM_{32}$ in a size of proportion $R_{32}$ with respect to length value $LX_W$ at a position that is a relationship designating the noted image WMM. During time $T_{31}$, the composite image formation section 33 then forms a composite image having the mask image represented by mask image data MMD notified from the mask image formation section 32 superimposed on the original image.

In this manner, once time $T_{31}$ has elapsed, the mask image formation section 32 calculates display position $(X_{E31}, Y_{E31})$ in the $X_S Y_S$ coordinate system, and magnification $M_{31}$, of the first element image $EMM_{31}$ in the additional image 1, using the above described equations (12) to (14). Then, after expanding or contracting element image $EMM_{31}$ with a magnification $M_{31}$, the mask image formation section 32 then rotates by angle $\theta_W$ with origin $O_E$ as a center in the $X_E Y_E$ coordinate system. The element image $EMM_2$ that has been expanded or contracted and rotated is then arranged in the $X_S Y_S$ coordinate system so that a coordinate position $(X_{E31}, Y_{E31})$ in the $X_S Y_S$ coordinate system becomes the position of the origin $O_E$.

Next, similarly to the case for the first element image $EMM_{11}$ of the additional image 1, the mask image formation section 32 calculates display position $(X_{E33}, Y_{E33})$ in the $X_S Y_S$ coordinate system of the element image $EMM_{33}$ in the additional image 2, using the following equations (18) and (19).

$$X_{E33} = (LX_W/LX_0)(X_{W33} * \cos\theta_W + Y_{W33} * \sin\theta) + X_{SW} \quad (18)$$

$$Y_{E33} = (LX_W/LX_0)(-X_{W33} * \sin\theta_W + Y_{W33} * \cos\theta) + Y_{SW} \quad (19)$$

Next the mask image formation section 32 calculates a magnification $M_{33}$ for expansion or contraction of the third element image $EMM_{33}$ from the following equation (20).

$$M_{33} = R_{33} * LX_W/LX_{E33} \quad (20)$$

Next, similarly to the case of the first element image $EMM_{31}$ described above, the mask image formation section 32 carries out expansion or contraction of the element image $EMM_{33}$ with a magnification $M_{33}$ and with origin $O_E$ as a center in the $X_E Y_E$ coordinate system. Continuing on, the mask image formation section 32 rotates the expanded or contracted element image $EMM_{33}$ by angle $\theta_W$ with origin $O_E$ as a center in the $X_S Y_S$ coordinate system. The element image $EMM_{33}$ that has been expanded or contracted and rotated is then arranged in the $X_S Y_S$ coordinate system so that a coordinate position $(X_{E33}, Y_{E33})$ in the $X_S Y_S$ coordinate system becomes the position of the origin $O_E$.

The result of the above processing is that a mask image $MMM_{32}$ such as is shown by image F16B in FIG. 16 is formed. The mask image formation section 32 then notifies data of the mask image $MMM_{32}$ to the composite image formation section 33 as mask image data MMD.

The composite image formation section 33 that has received this mask image data MMD and the original image data OMD forms a composite image $SMM_{32}$ having the mask image $MMM_{32}$ superimposed on the original image OMM. The composite image $SMM_{32}$ formed in this way is represented as image F17B in FIG. 17.

After that, during time $T_{32}$, the mask image formation section 32 forms the mask image displaying element image $EMM_{31}$ in a size of proportion $R_{31}$ with respect to length value $LX_W$ representing the size of the noted image WMM, and displaying element image $EMM_{33}$ in a size of proportion $R_{33}$ with respect to length value $LX_W$, at a position that is a relationship designating the noted image WMM. During time $T_{32}$, the composite image formation section 33 then forms a composite image having the mask image represented by mask image data MMD notified from the mask image formation section 32 superimposed on the original image.

In this manner, once time $T_{32}$ has elapsed, the mask image formation section 32, similarly to above, repeatedly forms the mask image that uses the above described element image $EMM_{31}$ and the element image $EMM_{32}$, and the mask image that uses the element image $EMM_{31}$ and the element image $EMM_{33}$, in time sequence. The composite image formation section 33 then sequentially forms composite images having the mask images represented by mask image data MMD notified from the mask image formation section 32 superimposed on the original image.

Information data SMD of the composite images formed in the above described first, second and third composite image formation examples is notified from the composite image formation section 33 to the basic control section 29. In accordance with designation carried out by a predetermined user operating the operation section 12, the basic control section 29 that has received this composite image information data displays the composite image SMM on the display section 13, and transmits to a fellow caller via the transceiver section 21.

As has been described above, with this embodiment, a region of a noted image WMM is specified in an original image, and noted image information WMD containing information relating to position and size of the noted image WMM region within the original image is extracted. Continuing on, a mask image MMM displayed superimposed on the original image OMM is formed based on noted image information WMD and mask image information registered in the mask image information file 40. As a result, a mask image comprised of element images selected using element image selection information contained in mask image information is formed on the original image OMM at a position determined using information connected to position of a region of noted image WMM and information representing a relationship to position of the noted image region contained in mask image information, and at a size determined by information relating to size of the region of the noted image WMM in the original image OMM, and information representing a relationship to size of the noted image region. A composite image having the mask image superimposed on the original image is then formed.

Therefore, according to this embodiment, it is possible to simply and appropriately form an image that a user has rendered on original image according to their interests.

Also, with this embodiment, it is possible for the information relating to the position of the noted image region contained in the mask image information to contain position information for a representative point of the noted image region WMR in the original image OMM. Therefore, it is possible to make information representing a relationship to position of a noted region contained in the mask image information, information representing a relative relationship for a representative point of the noted image, and it is possible to simplify information representing a relationship with position of the noted image region in the relationship information.

Also, with this embodiment, it is possible for the information relating to the position of the noted image region contained in the mask image information to further contain inclination information for the noted image region in the original image OMM. Therefore, by using the inclination information for the noted region of the original image OMM it is possible to form a composite image displaying a desired element image superimposed at a position corresponding to the inclination of the noted image region in the original image. It is also possible to display by holding inclination in the displayed element image corresponding to inclination of the noted image region in the original image.

Also with this embodiment, as information relating to position of the noted image contained in the mask image information, a representative point of the noted image is made an origin, and coordinate position information in a coordinate system determining direction of a coordinate axis based on inclination of the noted image region in the original image is included as display position information for an element image. Therefore, the information with respect to a representative point of the noted image region can be simply interpreted as coordinate position information of a coordinate system that determined by direction of coordinate axis based on inclination of the noted image region, wherein the system has an origin as a representative point of the noted image region. Herein, the noted information is the information representing a relative position of information relating to the position.

Also with this embodiment, it is possible for the mask image information to contain proportion information for size of the noted image region and size of the element image EMM at the time of displaying. In this case, even when size of the noted image within the original image OMM is changed from moment to moment, it is possible to form a mask image MMM containing element images EMM of size appropriate to the size of the noted image region.

Also with this embodiment, it is possible for the mask image information to contain execution time information for respective display of the element image EMM. In this case, by forming a mask image WMM according to the execution time information, it is possible to display respective desired element images EMM for only display execution times set to respective to desired times, and it is possible to form a mask image MMM to vary the dynamic.

Also, with this embodiment, it is possible for the mask image information to contain information time sequence display designation, for designating display a plurality of element images EMM in time sequence, and repeat of time sequence display. In this case, by forming a mask image WMM according to the time sequence display designation information, it is possible to display a plurality of element images on the original image OMM repeatedly in time sequence every desired time.

Also, with this embodiment, it is possible for the mask image information to contain information for simultaneous display designation, for designating display of a plurality of element images at the same time. In this case, it is possible to form a mask image having a desired plurality of element images EMM respectively displayed as desired positions, and it is possible to form mask images WMM of numerous variations.

Second Embodiment

Next, a second embodiment of the present invention will be described mainly with reference to FIG. 18 to FIG. 24, and with reference to appropriate other drawings. Note that, elements that are the same or similar to the above described first embodiment have the same reference numbers assigned, and repeat description will be omitted.

Compared to the first embodiment, this embodiment is different in that it is possible to take different images to the original image in the background to a person's image. In the following, description will mainly focus on points of difference.

Figure 18:
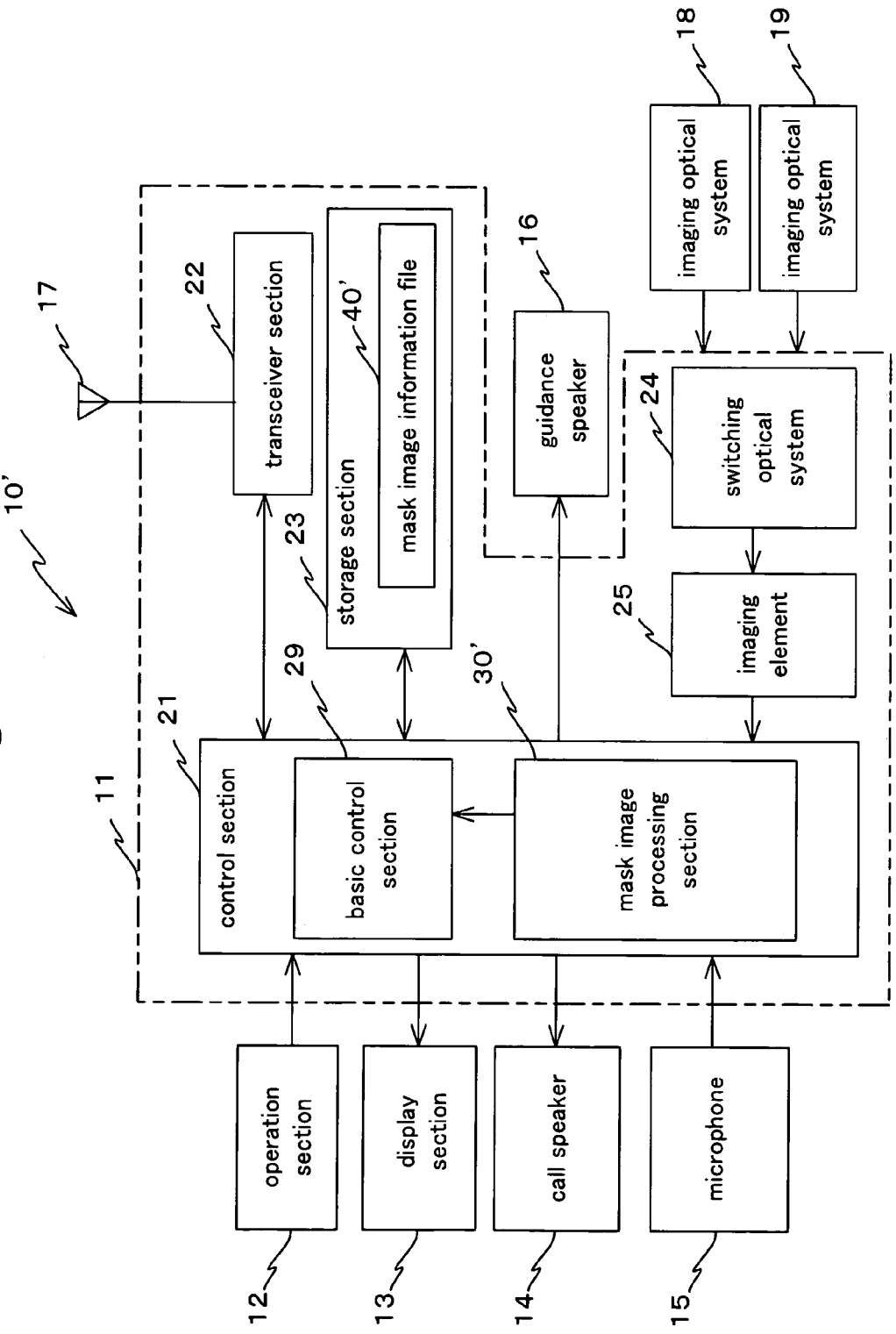
FIG. 18 is a functional block diagram for describing the internal structure of a mobile telephone unit of a second embodiment of the present invention.

As shown in FIG. 18, a portable telephone unit 10' of this embodiment is different from the portable telephone unit of the first embodiment in that the mask image processing section 30' is provided in the control section 21 and in that the mask image information file 40' is stored in the storage section 23, inside of the portable telephone body 11.

Figure 19:
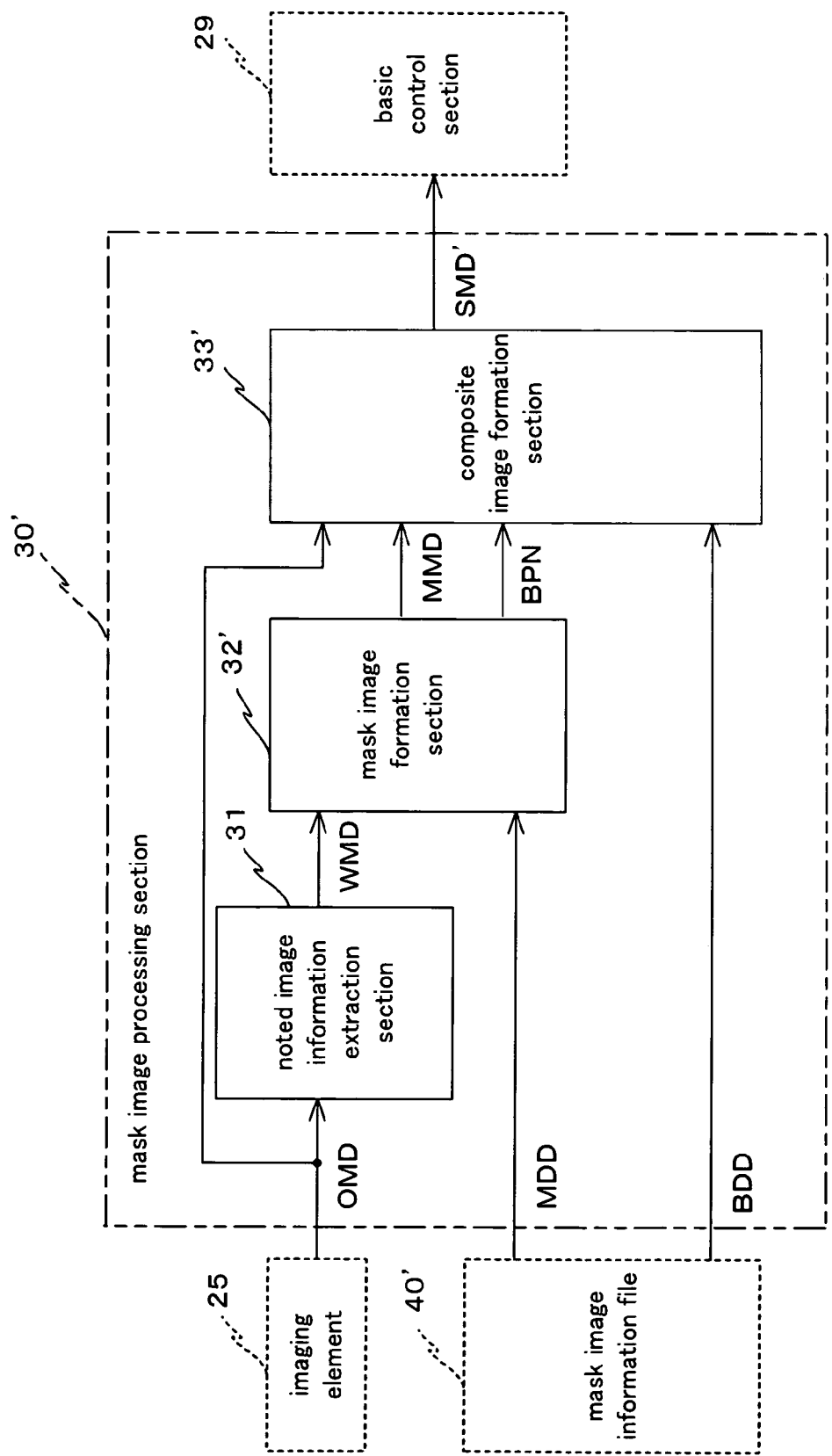
FIG. 19 is a functional block diagram for describing the internal structure of a mask image processing section of FIG. 18.
Figure 20:
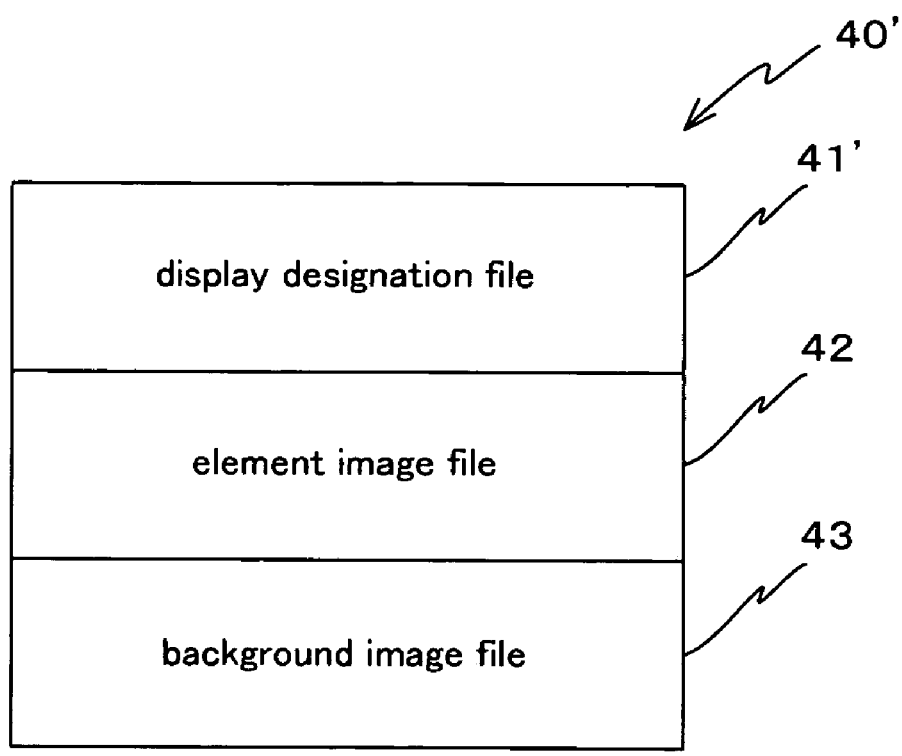
FIG. 20 is a drawing for describing the mask image information file structure of FIG. 18.

As shown in FIG. 19, the mask image processing section 30' comprises a noted image extraction section 31, a mask image formation section 32' and a composite image formation section 33'. In this case, the noted image information extraction section 31 operates in the same manner as in the case of the first embodiment.

As with the mask image formation section 32 of the first embodiment, the mask image formation section 32' forms mask image data MMD based on noted image information WMD extracted by the noted image information extraction section 31, and mask image information MDD stored in the mask image information file 40' in the above mentioned storage section 23. Also, the mask image formation section 32' creates background image information BPN made up of background image designation information representing whether or not there is background image designation and storage position information for the background image data BDD in the background designation information in the event that there is background image designation, based on mask image information MDD stored in the mask image information file 40'.

When the fact that there is background image designation has been notified using the background image information BPN, the composite image formation 33' first of all forms an image that has a person's image, being a specified display image within an original image, superimposed on a background image using the background image data BDD, as a background image containing image, based on original image data OMD and background image data BDD. Continuing on, the composite image formation section 33' forms composite image data SMD', wherein a mask image represented using mask image information MDD is superimposed on the image containing background image.

On the other hand, when the fact that there is no background image designation is notified using the background image information BPN, the composite image formation means 33' forms the original image as a background image containing image. Continuing on, the composite image formation section 33' forms composite image data SMD having a mask image represented using mask image information MMD superimposed on the background image containing image. In this case, the composite image data SMD' is the same as the composite image data SMD of the first embodiment.

The composite image data SMD' formed by the composite image formation section 33 is notified to the basic control section 29.

As shown in FIG. 20A, the mask image information file 40' inside the storage section 23 is comprised of (i) a display designation file 41' storing display designation descriptors for designating as to with what relationship to the noted image region in the original image the mask image is displayed and background image designation descriptors, (ii) the above described element image file 42, and (iii) a background image file 43 storing background image data BDD. Note that, the mask image information file 40' is provided to the portable telephone unit 10 from a contents provider via wireless circuit, or is provided after being formed by the user using a personal computer or the like by means of storage medium or a non-shown external interface.

Figure 22:
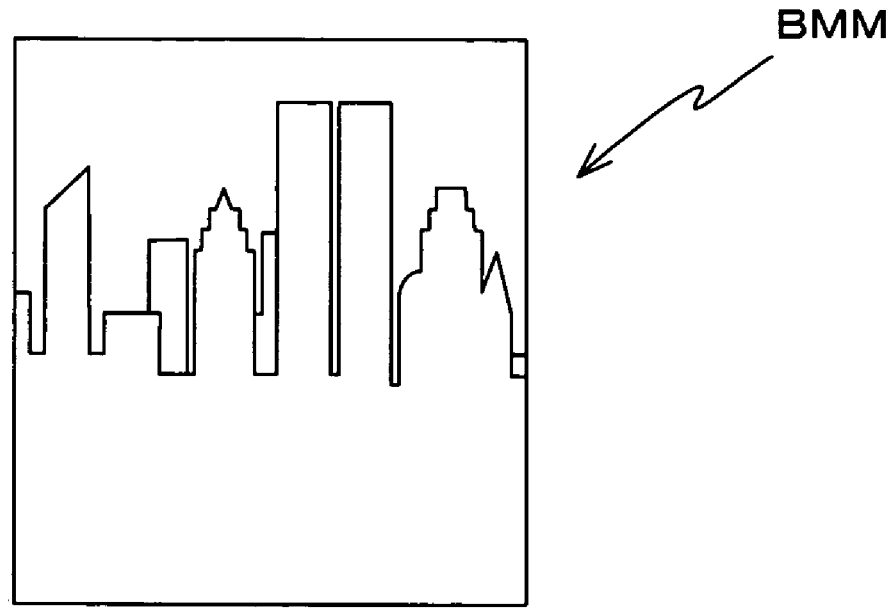
FIG. 22 is a drawing showing an example of a background image.

An example of display designation descriptors for the display designation file 41' of this embodiment is shown in FIG. 21. The descriptor example in FIG. 21 has the fact that there is background image designation added to the descriptor example of FIG. 7 for the case of the first embodiment. Specifically, with the display designation descriptor of FIG. 21, in addition to the descriptor for additional image 1 and additional image 2 in FIG. 7 from <simultaneous display designation> to <end simultaneous display designation>, a background image to be displayed simultaneously using the descriptor "background image designation" from <background image designation> to <end background image designation> is designated. Here, a header address BMMA for the background image file 43 in the storage section 23 is designated as "background image designation". In the following description, background image data BDD representing a background image BMM inside the background image region BMR having the same shape and size as the original image region OMR shown in FIG. 22 is stored in the background image file 43.

Note that, when there is no descriptor from <background image designation> to <end background image designation>, it means that there is no background image designation. Also in the case where "0" is described as the header address BMMA value for the background image file 43, it means that there is no background image designation.

In the following description will be given of the operation of forming a composite image in the portable telephone unit 10' constructed as described above.

Figure 23:
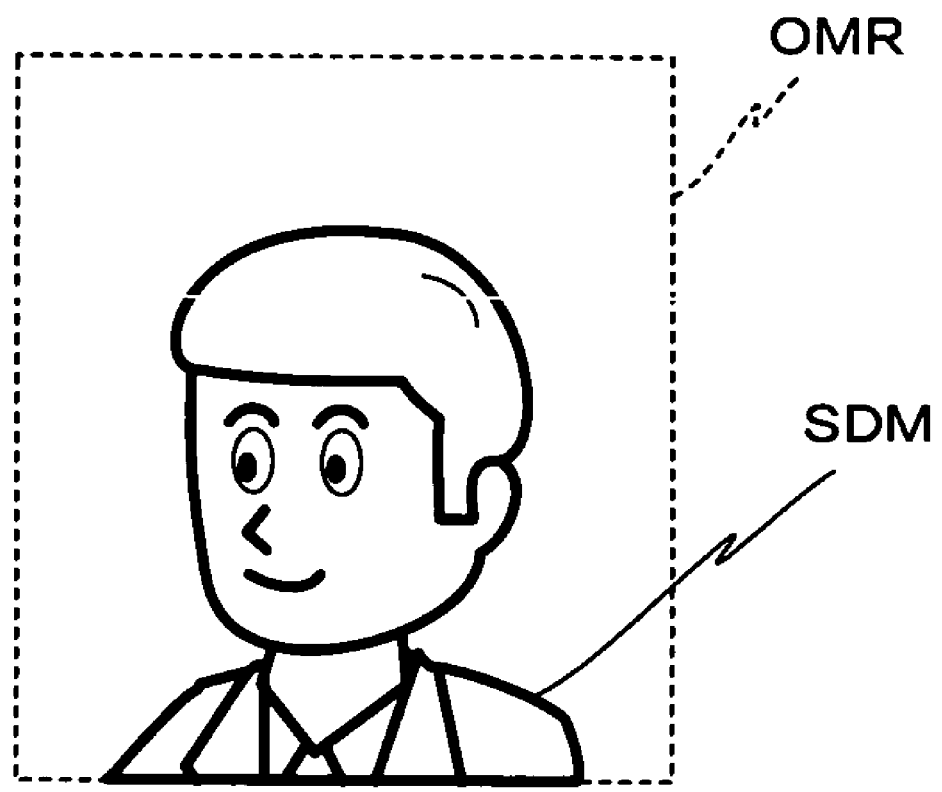
FIG. 23 is a drawing showing an example of a specified display image.

In addition to the prerequisites for the composite image formation operation in the first embodiment described above, the person image SDM inside the original image region OMR shown in FIG. 23 is a specified display image to be cut from the original image OMM.

First of all, similarly to the case of the first composite image forming example of the first embodiment, original image data OMD, being data for an original image OMM imaged on the imaging element 25, is notified to the noted image information extraction section 31, and noted image information data WMD is formed by the noted image information extraction section 31. The noted image data WMD formed in this way is notified from the noted image information extraction section 31 to the mask image formation section 32'.

Similarly to the case of the first composite image formation example for the first embodiment, the mask image formation section 32' that has received the noted image information data WMD creates data of a mask image MMMA based on noted image information data WMD and mask image information MDD, and notifies the data to the composite image formation section 33' as mask image data MMD. Also, the mask image formation section 32' creates background image information BPN comprising whether or not there is background image designation, and a header address of a background image file 43 for when there is background image designation, based on mask image information MDD, and notifies the background image information BPN to the composite image formation section 33'. In this case, as shown in FIG. 21 described above, background image designation is described in the display designation file 41' and so the fact that there is background image designation and a header address of the background image file 43 is included as background image information BPN.

The composite image formation section 33' that has received the mask image data MMD, original image data OMD and background image data BPN first of all determines whether or not there is background image designation based on the background image information BPN. In the present case, since there is background image designation, as described above, the determination result is affirmative. Continuing on, the composite image formation section 33' reads out background image data BDD from the background image file 43 using the header address of the background image file 43 in the background image information.

In this manner, the composite image formation section 33' that has acquired the background image data BDD, in addition to the mask image data MMD and the original image data OMD creates composite image data SMD as follows.

First of all, a personal image SDM is extracted from the original image OMM represented by the image F24A in FIG. 24 as a specified display image represented by the image F24B. This extraction is carried out after specifying the outline of the personal image SDM from general characteristics of a personal image, by extracting an image inside the outline.

Continuing on, the composite image formation region 33' superimposes the specified display image SDM on the background image BMM represented by image F24C, at the same position and same size as for the case of the original image OMR. As a result, a background additional image BAM represented as image F24D is formed.

Next, the composite image formation section 33' superimposes the mask image MMMA represented as the image F24E on the background additional image BAM. As a result, a composite image SMMA' represented as image F24F is formed.

The data SMD' of the composite image SMMA' formed in this manner is notified from the composite image formation section 33 to the basic control section 29. In accordance with designation carried out by a predetermined user operating the operation section 12, the basic control section 29 that has received this composite image information data displays the composite image SMMA' on the display section 13, and transmits to a fellow caller via the transceiver section 21.

Note that, in a case where background image designation is not described in the display designation file 41', or when the storage header address of the background image data BDD is "0", the mask image formation section 32' forms background image information BPN comprising only the fact that there is no background image designation and notifies this data to the composite image formation section 33'. The composite image formation section 33' that receives this type of background image information BPN determines that there is no background image designation and superimposes the mask image MMMA on the original image OMM to form a composite image. As a result, a composite image SMMA that is the same as for the case of the composite image formation example of the first embodiment is formed.

Also, with the above description when mask image designation is not described in the display designation file 41' but only background image designation is described, a background additional image BAM is formed in the composite image formation section 33' as a completed composite image.

Also, with the above description, description has been given of an example with background image designation in addition to mask image designation that is the same as for the case of the first composite image formation example for the first embodiment, but naturally it is also possible to have background image designation in addition to mask image designation that is the same as the second and third composite image designation examples of the first embodiment.

As has been described above, with this embodiment the composite image formation section 33' cuts a personal image SDM containing a facial image, being a noted image, from the original image, as a specified display image, superimposes it on the designated background image BMM and forms a background additional image BAM as a noted image comprising image. Then, the composite image formation section 33' superimposes the mask image MMMA on the background additional image BAM. Accordingly, rendering of the specified display image, such as a personal image SDM and so forth, according to the user's interests, can be carried out by selecting a mask image and a background image.

Note that, with the above described second embodiment, the mask image information file 40' comprises a background image file 43. On the other hand, it is also possible for the background image file 43 to be located in a region outside the mask image information file.

Also, with the above described first and second embodiments, the original image is a moving picture, but the present invention can also be applied to cases where the original image is a still image.

Also, with the above described first and second embodiments, image formation resulting from light passing through the imaging optical system 18 that images in a so-called self portrait state is made the original image, but it is also possible to make image formation resulting from light passing through the imaging optical system 19 that images in a so-called other party shooting state to be made the original image. It is also possible for an image stored in the storage section 23 to be made the original image.

Also, with the above-described first and second embodiments, no consideration has been given to structure along the depth of the noted objects in the noted image region of the original image, and image elements using in the mask image are also created with two-dimensional model. However, it is also possible to consider structure along the depth of the noted objects in the noted image region, and to create element image used in the mask imaged with three-dimensional models. In this case, even if noted objects are moving, having a rotational component about an axis parallel to the display screen, it is possible to form a mask image that affords no discomfort by tracking this rotation.

Also, the number of element imaged displayed at the same time is arbitrary. The number of element images carrying out time sequence display is also arbitrary.

Also with the above described first and second embodiments, the mask image information file is comprised of the display designation file and the element information file. It is also possible, however, for the mask image information file to further comprise an element image preview file, and when element image preview is designated, to perform element image preview on the display section 13 by referencing the element image preview file.

Also, specified phenomenon occurrence is determined for determining whether or not a predetermined phenomenon has occurred on the noted image region based on noted image information, and it is possible commence formation of the mask image using occurrence of the specified phenomenon as a trigger. For example, when the noted image is a facial image of a specified person, when the eyelids are closed, it is possible to form a composite image with tears flowing from positions of the eyes.

Also, with the above-described first and second embodiments, the present invention has been applied to a portable telephone unit, but it is also possible to apply the present invention to various other mobile communication terminals. It is also possible to apply the present invention to general electronic appliances such as a personal computer.

As has been described above, it is possible to apply the image processing method and image processing method of the present invention to processing of an acquired original image. Also the mobile communication terminal of the present invention can be applied to a mobile communication terminal having van image mail function and a television telephone function.

What is claimed is:

1. An image processing method, comprising:
providing a computer programmed to perform processing of an image displayed on an imaging screen, the processing comprising the steps of:
specifying a noted image region, containing a noted image, in an original image, and extracting noted image information containing information relating to position and size of the noted image within the original image;
forming a mask image to be displayed superimposed on the noted image, based on a mask image information file containing the noted image information, at least one relationship information representing a relationship to position and size of the noted image region, element image selection information representing selection of information of specified element images respectively corresponding to the relationship information, respective execution time information for graphic display determined by combining the relationship information and element image information corresponding to the relationship information, and at least one element image information selected using the element image selection information;
wherein the mask image information file further comprises background image selection information showing information of a specified background image, and
cutting a specified display image containing the noted image from the original image,
forming a composite image having the specified display image superimposed on the specified background image at the same position and size as for the original image, and
having the mask image superimposed on the noted image in the display image at the same location and same size as for the original image.

2. The image processing method according to claim 1, comprising providing a cellular phone, and wherein the method is carried out by the cellular phone.

3. An image processing method, comprising:
providing a computer programmed to perform processing of an image displayed on an imaging screen, the processing comprising the steps of:
specifying a noted image region, containing a noted image, in an original image, and extracting noted image information containing information relating to position and size of the noted image within the original image;
forming a mask image to be displayed superimposed on the noted image, based on a mask image information file containing the noted image information, at least one relationship information representing a relationship to position and size of the noted image region, element image selection information representing selection of information of specified element images respectively corresponding to the relationship information, respective execution time information for graphic display determined by combining the relationship information and element image information corresponding to the relationship information, and at least one element image information selected using the element image selection information; and
having the mask image superimposed on the noted image in the display image at the same location and same size as for the original image;
wherein the relationship information comprises proportion information for size of the noted image region and size for display time of a specified graphic.

4. The image processing method according to claim 3, comprising providing a cellular phone, and wherein the method is carried out by the cellular phone.

5. An image processing method, comprising:
providing a computer programmed to perform processing of an image displayed on an imaging screen, the processing comprising the steps of:
specifying a noted image region, containing a noted image, in an original image, and extracting noted image information containing information relating to position and size of the noted image within the original image;
forming a mask image to be displayed superimposed on the noted image, based on a mask image information file containing the noted image information, at least one relationship information representing a relationship to position and size of the noted image region, element image selection information representing selection of information of specified element images respectively corresponding to the relationship information, respective execution time information for graphic display determined by combining the relationship information and element image information corresponding to the relationship information, and at least one element image information selected using the element image selection information; and
having the mask image superimposed on the noted image in the display image at the same location and same size as for the original image;
wherein the mask image information further comprises information for display of a plurality of types of graphic display in time sequence, fixed by combining the relationship information and element image selection information corresponding to the relationship information, and for time sequence display designation for designating repeat of time sequence display.

6. The image processing method according to claim 5, comprising providing a cellular phone, and wherein the method is carried out by the cellular phone.

7. An image processing method, comprising:
providing a computer programmed to perform processing of an image displayed on an imaging screen, the processing comprising the steps of:
specifying a noted image region, containing a noted image, in an original image, and extracting noted image information containing information relating to position and size of the noted image within the original image;

forming a mask image to be displayed superimposed on the noted image, based on a mask image information file containing the noted image information, at least one relationship information representing a relationship to position and size of the noted image region, element image selection information representing selection of information of specified element images respectively corresponding to the relationship information, respective execution time information for graphic display determined by combining the relationship information and element image information corresponding to the relationship information, and at least one element image information selected using the element image selection information; and having the mask image superimposed on the noted image in the display image at the same location and same size as for the original image;

wherein the mask image information further comprises simultaneous display designation information for designating display of a plurality of types of graphic display at the same time, fixed by combining the relationship information and element image selection information corresponding to the relationship information.

8. The image processing method according to claim 7, comprising providing a cellular phone, and wherein the method is carried out by the cellular phone.

9. An image processing method, comprising:

providing a computer programmed to perform processing of an image displayed on an imaging screen, the processing comprising the steps of:

specifying a noted image region, containing a noted image, in an original image, and extracting noted image information containing information relating to position and size of the noted image within the original image;

forming a mask image to be displayed superimposed on the noted image, based on a mask image information file containing the noted image information, at least one relationship information representing a relationship to position and size of the noted image region, element image selection information representing selection of information of specified element images respectively corresponding to the relationship information, respective execution time information for graphic display determined by combining the relationship information and element image information corresponding to the relationship information, and at least one element image information selected using the element image selection information; and having the mask image superimposed on the noted image in the display image at the same location and same size as for the original image;

wherein the original image is a moving image.

10. The image processing method according to claim 9, comprising providing a cellular phone, and wherein the method is carried out by the cellular phone.

11. An image processing method, comprising:

providing a computer programmed to perform processing of an image displayed on an imaging screen, the processing comprising the steps of:

specifying a noted image region, containing a noted image, in an original image, and extracting noted image information containing information relating to position and size of the noted image within the original image;

forming a mask image to be displayed superimposed on the noted image, based on a mask image information file containing the noted image information, at least one relationship information representing a relationship to position and size of the noted image region, element image selection information representing selection of information of specified element images respectively corresponding to the relationship information, respective execution time information for graphic display determined by combining the relationship information and element image information corresponding to the relationship information, and at least one element image information selected using the element image selection information; and having the mask image superimposed on the noted image in the display image at the same location and same size as for the original image;

further comprising a step of determining whether or not a predetermined phenomenon has occurred in the noted image region based on the noted image information, and wherein the mask image formation commences after positive determination in the specified phenomenon occurrence determination step.

12. The image processing method according to claim 11, comprising providing a cellular phone, and wherein the method is carried out by the cellular phone.

13. A mobile communication terminal provided with an image processing device for carrying out processing of an image displayed on an imaging screen, comprising:

noted image information extracting means for specifying an noted image region, being a region for an image to be focused on, in an original image, and extracting noted image information relating to position and size of the noted image region within the original image;

storage means for storing a mask image information file registering mask image information comprising at least one relationship information representing a relationship to position and size of the noted image region, element image selection information representing selection of information for a specified element image respectively corresponding to the relationship information, respective execution time information for graphic display determined by combining the relationship information and element image information corresponding to the relationship information, and at least one element image information selected using the element image selection information;

mask image formation means for forming a mask image displayed superimposed on the original image, based on the noted image information and the mask image information; and composite image formation means for forming a composite image having the mask image superimposed on a noted image containing image that includes the noted image inside the noted image region at the same location and same size as for the original image.

* * * * *